(12) United States Patent
Sensui et al.

(10) Patent No.: US 6,757,108 B2
(45) Date of Patent: Jun. 29, 2004

(54) ZOOM LENS SYSTEM

(75) Inventors: Takayuki Sensui, Tokyo (JP); Takayuki Ito, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/440,121

(22) Filed: May 19, 2003

(65) Prior Publication Data

US 2003/0218799 A1 Nov. 27, 2003

(30) Foreign Application Priority Data

May 20, 2002 (JP) .................................... 2002-145089

(51) Int. Cl.$^7$ .............................................. G02B 15/14
(52) U.S. Cl. .................... 359/680; 359/686; 359/691
(58) Field of Search ................................ 359/691, 689, 359/686, 680–682, 676, 683, 708, 713–717

(56) References Cited

U.S. PATENT DOCUMENTS

| | | | | |
|---|---|---|---|---|
| 5,054,897 A | * | 10/1991 | Ozawa | 359/680 |
| 5,485,313 A | * | 1/1996 | Betensky | 359/689 |
| 5,568,323 A | | 10/1996 | Sensui | 359/689 |
| 5,748,384 A | | 5/1998 | Sensui | 359/686 |
| 5,991,093 A | | 11/1999 | Murata et al. | 359/691 |
| 6,078,435 A | | 6/2000 | Yoneyama | 359/691 |
| 6,532,114 B1 | * | 3/2003 | Kohno et al. | 359/689 |

FOREIGN PATENT DOCUMENTS

JP          5323104          12/1993

OTHER PUBLICATIONS

English Language Translation of JP Appln. No. 5–323104.

* cited by examiner

Primary Examiner—Jordan M. Schwartz
(74) Attorney, Agent, or Firm—Greenblum & Bernstein P.L.C.

(57) ABSTRACT

A zoom lens system includes at least two lens groups, and a negative first lens group is positioned at the most object-side of the zoom lens system. The negative first lens group includes a negative sub-lens group and a positive sub-lens group. The positive sub-lens group includes a positive lens element and a rearmost lens element of the negative first lens group. The rearmost lens element includes a plastic lens element having at least one aspherical surface.

5 Claims, 24 Drawing Sheets

F_NO.=4

—— d Line
······ g Line
---- C Line

-0.5  0.5
SPHERICAL
ABERRATION

CHROMATIC
ABERRATION

W=28.4°

—— S
-- M

-0.5  0.5
ASTIGMATISM

W=28.4°

-5.0(%)5.0
DISTORTION

F_NO.=5.9

—— d Line
······ g Line
---- C Line

-0.5  0.5
SPHERICAL
ABERRATION

CHROMATIC
ABERRATION

W=15.7°

—— S
-- M

-0.5  0.5
ASTIGMATISM

W=15.7°

-5.0(%)5.0
DISTORTION

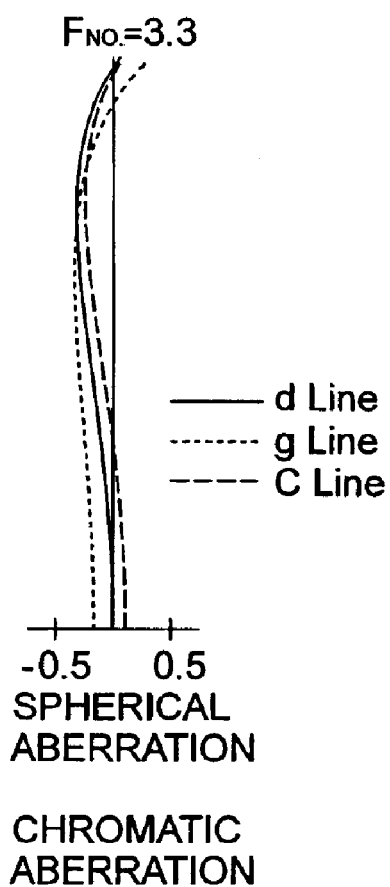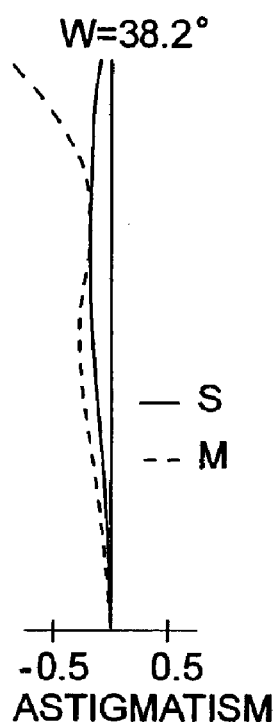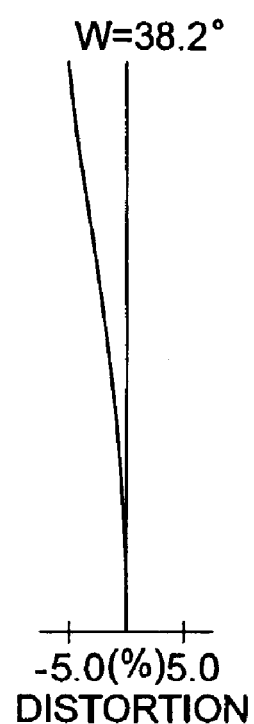
Fig. 6A — F_NO.=3.3 — SPHERICAL ABERRATION — CHROMATIC ABERRATION (d Line, g Line, C Line)
Fig. 6B — W=38.2° — ASTIGMATISM (S, M)
Fig. 6C — W=38.2° — DISTORTION F_No.=4

— d Line
······ g Line
--- C Line

-0.5  0.5
SPHERICAL
ABERRATION

CHROMATIC
ABERRATION

W=28.4°

— S
-- M

-0.5  0.5
ASTIGMATISM

W=28.4°

-5.0(%)5.0
DISTORTION

F_No.=5.9

— d Line
······ g Line
--- C Line

-0.5  0.5
SPHERICAL
ABERRATION

CHROMATIC
ABERRATION

W=15.7°

— S
-- M

-0.5  0.5
ASTIGMATISM

W=15.7°

-5.0(%)5.0
DISTORTION

F_NO.=4

W=28.4°

W=28.4°

F_NO.=5.9

W=15.7°

W=15.7°

F_NO.=3.3
SPHERICAL ABERRATION
CHROMATIC ABERRATION

W=38.2°
ASTIGMATISM

W=38.2°
DISTORTION

F_NO.=3.9
— d Line
······ g Line
---- C Line
-0.5  0.5
SPHERICAL ABERRATION
CHROMATIC ABERRATION

W=28.4°
— S
-- M
-0.5  0.5
ASTIGMATISM

W=28.4°
-5.0(%)5.0
DISTORTION

F_NO.=5.9
— d Line
······ g Line
---- C Line
-0.5  0.5
SPHERICAL ABERRATION
CHROMATIC ABERRATION

W=15.7°
— S
-- M
-0.5  0.5
ASTIGMATISM

W=15.7°
-5.0(%)5.0
DISTORTION

F_{NO.}=3.6

— d Line
······ g Line
--- C Line

-0.5  0.5
SPHERICAL
ABERRATION

CHROMATIC
ABERRATION

W=38.1°

— S
-- M

-0.5  0.5
ASTIGMATISM

W=38.1°

-5 (%) 5
DISTORTION

F_NO.=4.5 d Line
g Line
C Line
-0.5  0.5
SPHERICAL
ABERRATION

CHROMATIC
ABERRATION

W=22°

— S
-- M
-0.5  0.5
ASTIGMATISM

W=22°

-5 (%) 5
DISTORTION

F_NO.=5.9 d Line
g Line
C Line
-0.5  0.5
SPHERICAL
ABERRATION

CHROMATIC
ABERRATION

W=13.7°

— S
-- M
-0.5  0.5
ASTIGMATISM

W=13.7°

-5 (%) 5
DISTORTION

F_{NO.}=4.5

— d Line
······ g Line
--- C Line

-0.5  0.5
SPHERICAL
ABERRATION

CHROMATIC
ABERRATION

W=22°

— S
-- M

-0.5  0.5
ASTIGMATISM

W=22°

-5 (%) 5
DISTORTION

F_{NO.}=5.9

— d Line
······ g Line
--- C Line

-0.5  0.5
SPHERICAL
ABERRATION

CHROMATIC
ABERRATION

W=13.7°

— S
-- M

-0.5  0.5
ASTIGMATISM

W=13.7°

-5 (%) 5
DISTORTION

Fig. 26A: F_{NO.}=3.5, SPHERICAL ABERRATION, CHROMATIC ABERRATION (d Line, g Line, C Line)
Fig. 26B: W=38.1°, ASTIGMATISM (S, M)
Fig. 26C: W=38.1°, DISTORTION

F_NO.=4.5

—— d Line
······ g Line
---- C Line

-0.5   0.5
SPHERICAL
ABERRATION

CHROMATIC
ABERRATION

W=22°

— S
-- M

-0.5   0.5
ASTIGMATISM

W=22°

-5 (%) 5
DISTORTION

F_NO.=5.9

—— d Line
······ g Line
---- C Line

-0.5   0.5
SPHERICAL
ABERRATION

CHROMATIC
ABERRATION

W=13.7°

— S
-- M

-0.5   0.5
ASTIGMATISM

W=13.7°

-5 (%) 5
DISTORTION

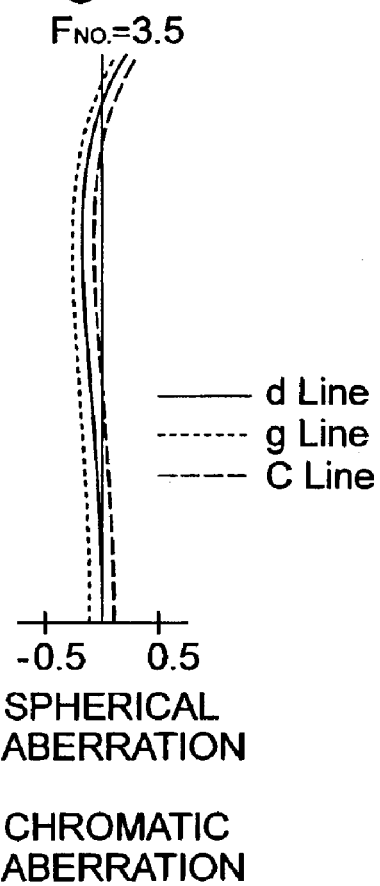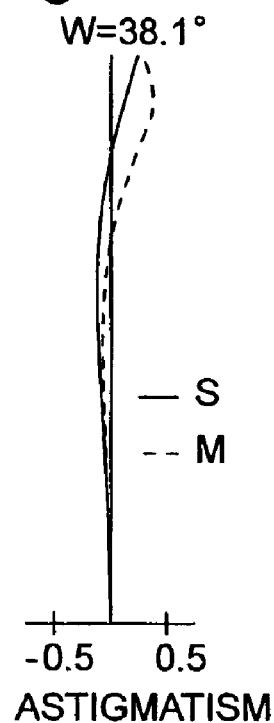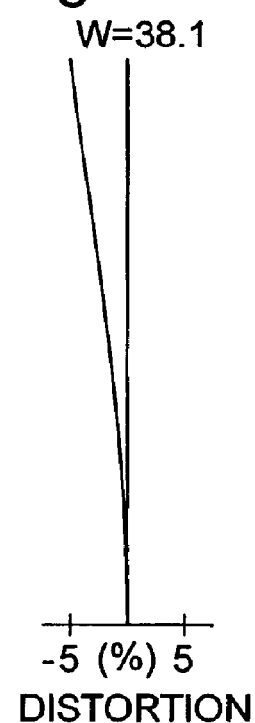

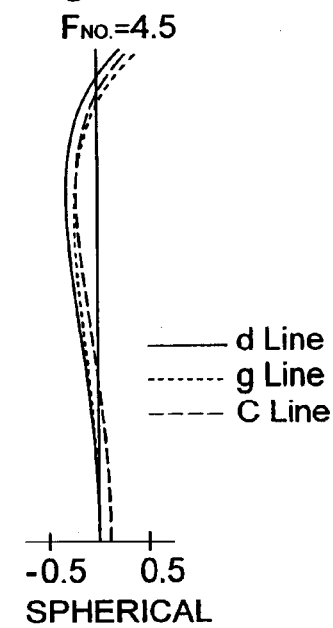
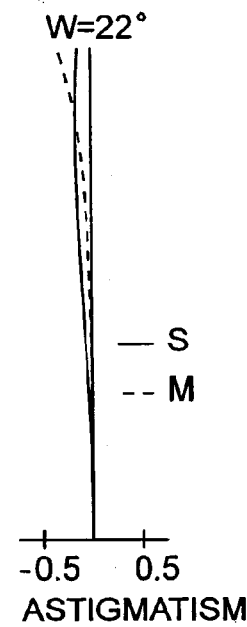
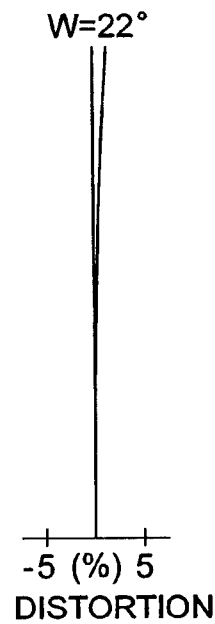
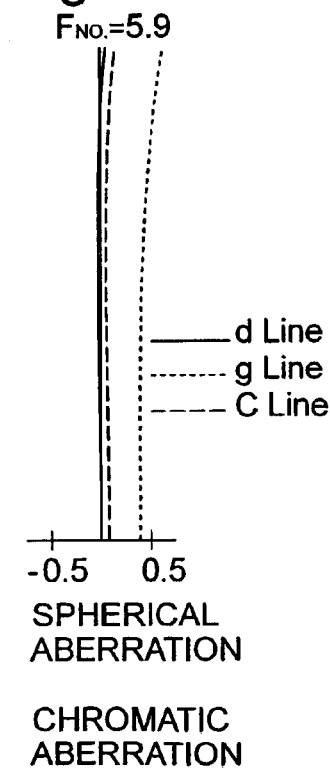
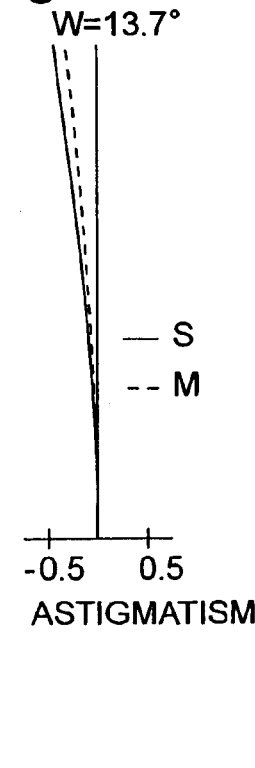
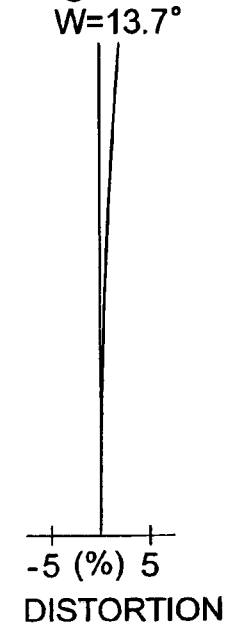

ZOOM LENS SYSTEM

BACKGROUND OF THE INVENTION

1. Field of the Invention

The present invention relates to a miniaturized and low-cost zoom lens system having a half angle-of-view of approximately 38° at the short focal length extremity and a zoom ratio of approximately 3.

2. Description of the Prior Art

In a conventional wide-angle zoom lens system having a large angle of view of 38° at the short focal length extremity, a first lens group is provided with a negative optical power (hereinafter, a negative first lens group), i.e., a negative-lead type zoom lens system, and the negative first lens group generally includes a positive lens element, a negative lens element, and a positive lens element, in this order from the object. In the above-explained negative-lead type zoom lens system, a positive lens element is provided as the most object-side lens element in order to correct distortion occurred in the negative direction; however, the diameter and the overall length of the negative first lens group increase, so that, further miniaturization becomes difficult.

On the other hand, there are examples of utilizing a hybrid lens element in the negative first lens group in order to achieve further miniaturization; however, cost reduction is difficult.

SUMMARY OF THE INVENTION

The present invention provides a miniaturized and low-cost zoom lens system having a half angle-of-view of approximately 38° at the short focal length extremity, and having a zoom ratio of approximately 3.

According to an aspect of the present invention, there is provided a zoom lens system including at least two lens groups, and a negative first lens group is positioned at the most object-side of the zoom lens system.

The negative first lens group includes a negative sub-lens group and a positive sub-lens group, in this order from the object.

The positive sub-lens group includes a positive lens element and the most image-side (a rearmost) lens element of the negative first lens group, in this order from the object.

The rearmost lens element includes a plastic lens element having at least one aspherical surface.

The zoom lens system satisfies the following conditions:

$$|f_1/f_{1B-2}|<0.3 \quad (1)$$

$$0.02<D_{1B-2}/fw<0.2 \quad (2)$$

$$0.001<D_{B1-B2}/fw<0.1 \quad (3)$$

wherein
$f_1$ designates the focal length of the negative first lens group;
$f_{1B-2}$ designates the focal length of the rearmost lens element of the negative first lens group;
$fw$ designates the focal length of the entire the zoom lens system at the short focal length extremity;
$D_{1B-2}$ designates the thickness of the rearmost lens element of the negative first lens group; and
$D_{B1-B2}$ designates the distance between the positive lens element and the rearmost lens element of the positive sub-lens group.

The aspherical surface of the rearmost lens element is provided on the object-side surface thereof, and the aspherical surface can be formed so that the positive power becomes stronger, compared with a paraxial spherical surface, in a direction away from the optical axis.

The aspherical surface of the rearmost lens element is provided on the image-side surface thereof, and the aspherical surface can be formed so that the positive power becomes stronger, compared with a paraxial spherical surface, in a direction away from the optical axis.

The aspherical surface of the rearmost lens element of the negative first lens group preferably satisfies the following condition:

$$-1<\Delta V<-0.1 \quad (4)$$

wherein
$\Delta V$ designates the amount of change of the distortion coefficient due to the aspherical surface of the rearmost lens element of the negative first lens group under the condition that the focal length at the short focal length extremity is converted to 1.0.

The refractive index $N_{1A}$ of a glass material of at least one negative lens element of the negative object-side sub-lens group in the negative first lens group can satisfy the following condition:

$$N_{1A}<1.66 \quad (5)$$

The present disclosure relates to subject matter contained in Japanese Patent Application No. 2002-145089 (filed on May 20, 2002) which is expressly incorporated herein in its entirety.

BRIEF DESCRIPTION OF THE DRAWINGS

The present invention will be discussed below in detail with reference to the accompanying drawings, in which:

FIGS. 6A, 6B and 6C show aberrations occurred in the lens arrangement shown in FIG. 5 at the short focal length extremity;

FIGS. 30A, 30B and 30C show aberrations occurred in the lens arrangement shown in FIG. 29 at the short focal length extremity;

FIGS. 31A, 31B and 31C show aberrations occurred in the lens arrangement shown in FIG. 29 at an intermediate focal length; and FIGS. 32A, 32B and 32C show aberrations occurred in the lens arrangement shown in FIG. 29 at the long focal length extremity.

DESCRIPTION OF THE PREFERRED EMBODIMENTS

Figure 1:
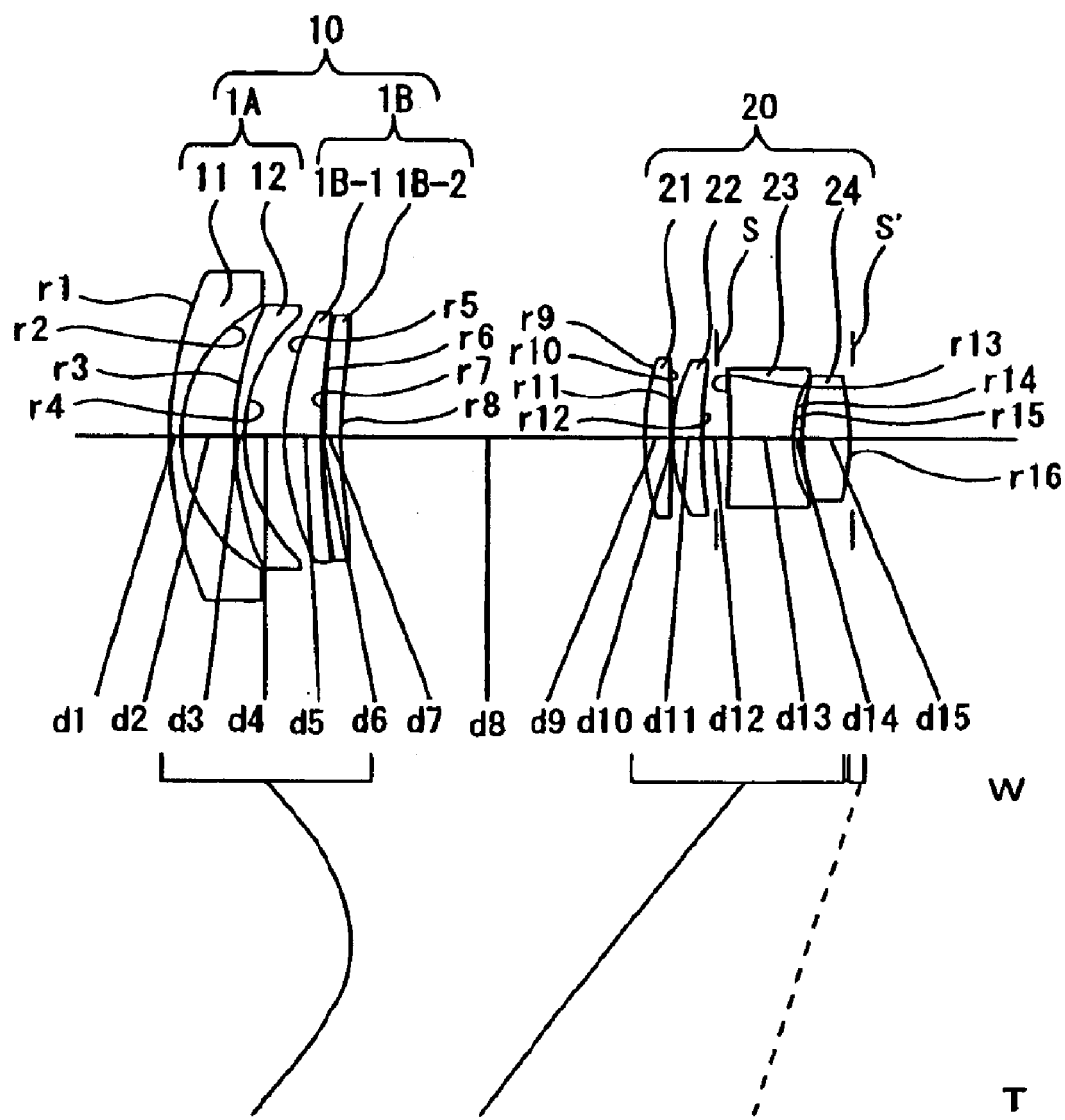
FIG. 1 is a lens arrangement of a zoom lens system according to a first embodiment of the present invention.

As shown in the lens arrangements of FIGS. 1, 5, 9, 13, 17, 21, 25 and 29, the zoom lens system includes at least two lens groups, and the negative first lens group 10 is positioned at the most object-side of the zoom lens system, i.e., the zoom lens system according to the present invention is a negative-lead type zoom lens system.

More specifically, the embodiments of FIGS. 1, 5, 9 and 13 are applied to a two-lens-group arrangement; and the embodiments of FIGS. 17, 21, 25 and 29 are applied to a four-lens-group arrangement. Here, note that in each embodiment, the most object-side lens group has a negative power.

The negative first lens group 10 includes a negative first sub-lens group 1A and positive second sub-lens group 1B, in this order from the object. The positive second sub-lens group 1B includes a positive lens element 1B-1, and a lens element 1B-2 which is the rearmost plastic lens element of the negative first lens group 10, in this order from the object. Note that the rearmost plastic lens element 1B-2 has at least one aspherical surface thereon. The zoom lens system satisfies conditions (1), (2) and (3).

In a zoom lens system of this type, if an aspherical surface is not employed, the negative first lens group generally includes a positive lens element, a negative lens element, and a positive lens element, in this order from the object. The correcting of distortion is performed by providing a positive lens element at the most object-side of the negative first lens group.

On the other hand, in the embodiments of the present invention, the most object-side sub-lens group is provided as a negative sub-lens group; and an aspherical surface is provided on the rearmost plastic lens element 1B-2 which has the smallest diameter among the lens elements of the negative first lens group 10. This arrangement is effective in correcting distortion; and the diameter of the negative first lens group 10 can be made smaller, the overall length of the zoom lens system can be made shorter, and the cost thereof can also be reduced.

Condition (1) specifies the ratio of the power of the negative first lens group 10 to the power of the rearmost lens element (plastic aspherical lens element) 1B-2.

If $|f_1/f_{1B-2}|$ exceeds the upper limit of condition (1), the power of the rearmost lens element 1B-2 becomes too strong, and the optical performance of the lens element largely deteriorates with respect to a change in temperature and humidity.

Condition (2) specifies the thickness of the rearmost lens element (plastic aspherical lens element) 1B-2 of the negative first lens group 10.

If $D_{1B-2}/fw$ exceeds the lower limit of condition (2), the molding of the rearmost lens element 1B-2 becomes difficult, and cannot be molded with a sufficient precision determined at the design stage thereof.

If $D_{1B-2}/fw$ exceeds the upper limit of condition (2), the size of the negative first lens group 10 increases, so that further miniaturization cannot be achieved.

Condition (3) specifies the distance between the positive lens element 1B-1 and the rearmost lens element (plastic aspherical lens element) 1B-2 of the positive second sub-lens group 1B.

If $D_{B1-B2}/fw$ exceeds the lower limit of condition (3), there is a possibility that the positive lens element 1B-1 interferes with the rearmost lens element 1B-2 due to manufacture error.

If $D_{B1-B2}/fw$ exceeds the upper limit of condition (3), the size of the negative first lens group 10 increases, so that further miniaturization becomes difficult.

In regard to the rearmost lens element 1B-2, in the case where the aspherical surface is formed on the object-side surface thereof, the aspherical surface indicates asphericity in the positive direction from the paraxial spherical surface; and in the case where the aspherical surface is formed on the image-side surface thereof, the aspherical surface indicates asphericity in the negative direction from the paraxial spherical surface. Due to these characteristics of asphericity, the positive power around the periphery of the lens element can be made stronger, so that negative distortion (barrel-type distortion) can be corrected, compared with the case where a spherical lens element is used.

Condition (4) determines a numerical value indicating the effects on the correcting of distortion by the aspherical surface at the short focal length extremity.

If ΔV exceeds the lower limit of condition (4), distortion is under-corrected.

If ΔV exceeds the upper limit of condition (4), rearward distortion increases, the returning-amount of distortion defined below becomes larger.

The returning-amount of distortion is the difference between the maximum value of distortion and distortion at the maximum image height, under the condition that distortion is maximum at an intermediate area between the central area of the image plane and the periphery thereof, and that distortion at the periphery is smaller than distortion at the intermediate area.

Condition (5) is for the reduction in cost of the zoom lens system. If an attempt is made to use an inexpensive glass material having a refractive index of 1.66 or less for at least one negative lens element of the negative sub-lens group 1A in the negative first lens group 10 so that condition (5) is satisfied, the, cost of the zoom lens system can be reduced.

If N1A exceeds the upper limit of condition (5), the cost for the material is increased, so that further cost reduction becomes difficult.

The plastic aspherical lens element is employed for the rearmost lens element 1B-2 of the negative first lens group 10 because the rearmost lens element 1B-2 has the smallest diameter, as explained, in the negative first lens group 10. Moreover, it should be noted that the plastic aspherical lens element is easy to be replaced, if any problem occurs.

In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. In the diagrams of astigmatism, S designates the sagittal image, and M designates the meridional image. In the tables, FNO designates the f-number, f designates the focal length of the entire zoom lens system, fB designates the back focal distance, W designates the half angle-of-view (°), r designates the radius of curvature, d designates the lens-element thickness or distance between lens elements, Nd designates the refractive index of the d-line, and νd designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}\ldots$$

wherein:
c designates a curvature of the aspherical vertex (1/r);
y designates a distance from the optical axis;
K designates the conic coefficient; and
A4 designates a fourth-order aspherical coefficient;

A6 designates a sixth-order aspherical coefficient;
A8 designates a eighth-order aspherical coefficient; and
A10 designates a tenth-order aspherical coefficient.

The relationship between the aspherical coefficients and aberration coefficients are as follows:

1. The shape of an aspherical surface is defined as follows:

$$x=cy^2/(1+[1-\{1+K\}c^2y^2]^{1/2})+A4y^4+A6y^6+A8y^8+A10y^{10}\ldots$$

wherein:
x designates a distance from a tangent plane of an aspherical vertex;
y designates a distance from the optical axis;
c designates a curvature of the aspherical vertex (1/r),
K designates a conic constant;

2. In this equation, to obtain the aberration coefficients, the following substitution is made to replace K with "0" (Bi=Ai when K=0).

$$B4=A4+Kc^3/8;$$

$$B6=A6+(K^2+2K)c^5/16;$$

$$B8=A8+5(K^3+3K^2+3K)c^7/128$$

$B10=A10+7(K^4+4K^3+6K^2+4K)c^9/256;$ and therefore, the following equation is obtained:

$$x=cy^2/[1+[1-c^2y^2]^{1/2}]+B4y^4+B6y^6+B8y^8+B10y^{10}\ldots$$

3. Furthermore, in order to normalize the focal length f to 1.0, the followings are considered:

$$X=x/f;\ Y=y/f;\ C=f*c;$$

$$\alpha4=f^3B4;\ \alpha6=f^5B6;\ \alpha8=f^7B8;\ \alpha10=f^9B10$$

Accordingly, the following equation is obtained.

$$X=CY^2/[1+[1-C^2Y^2]^{1/2}]+\alpha4Y^4+\alpha6Y^6+\alpha8Y^8+\alpha10Y^{10}+\ldots$$

4. $\Phi=8(N'-N)\alpha4$ is defined, and the third aberration coefficients are defined as follows:
I designates the spherical aberration coefficient;
II designates the coma coefficient;
III designates the astigmatism coefficient;
IV designates the curvature coefficient of the sagittal image surface; and
V designates the distortion coefficient; and therefore, the influence of the fourth-order aspherical-surface coefficient (α4) on each aberration coefficient is defined as:

$$\Delta I=h^4\Phi$$

$$\Delta II=h^3k\Phi$$

$$\Delta III=h^2k^2\Phi$$

$$\Delta IV=h^2k^2\Phi$$

$$\Delta V=hk^3\Phi$$

wherein
h1 designates the height at which a paraxial axial light ray strikes the first surface of the lens system including the aspherical surface;
h designates the height at which the paraxial axial light ray strikes the aspherical surface when the height h1 is 1;
k1 designates the height at which a paraxial off-axis ray, passing through the center of the entrance pupil, strikes the first surface of the lens system including the aspherical surface;

k designates the height at which the paraxial off-axis light ray strikes the aspherical surface when the height k1 is −1;

N' designates the refractive index of a medium on the side of the image with respect to the aspherical surface; and N designates the refractive index of a medium on the side of the object with respect to the aspherical surface.

[Embodiment 1]

Figure 2A:
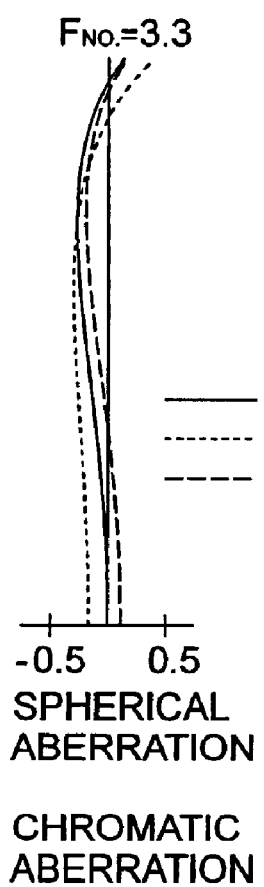
FIGS. 2A, 2B and 2C show aberrations occurred in the lens arrangement shown in FIG. 1 at the short focal length extremity.
Figure 2B:
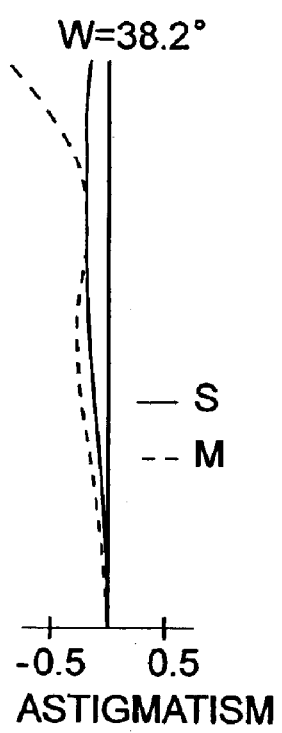
Figure 2C:
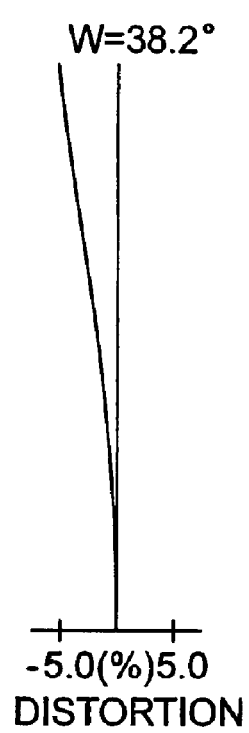
Figure 3A:
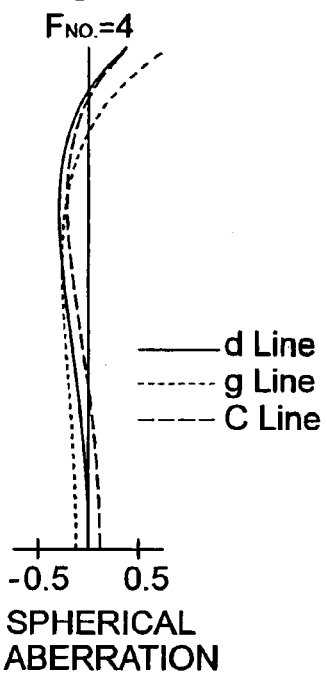
FIGS. 3A, 3B and 3C show aberrations occurred in the lens arrangement shown in FIG. 1 at an intermediate focal length.
Figure 3B:
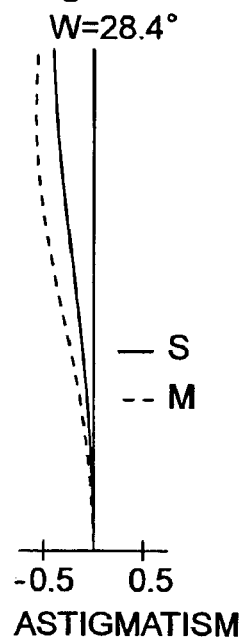
Figure 3C:
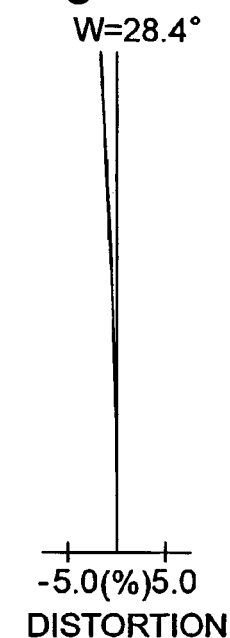
Figure 4A:
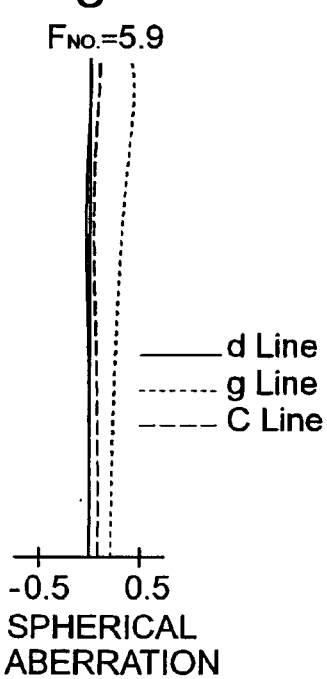
FIGS. 4A, 4B and 4C show aberrations occurred in the lens arrangement shown in FIG. 1 at the long focal length extremity.
Figure 4B:
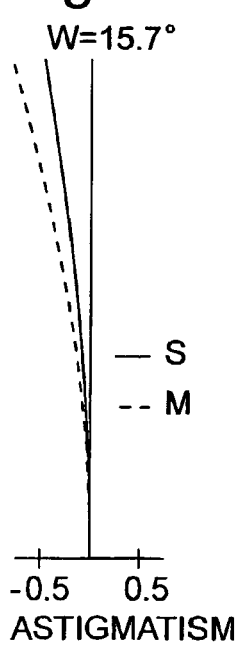
Figure 4C:
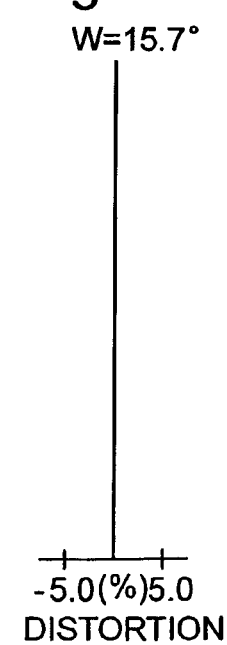

FIG. 1 is the lens arrangement of a zoom lens system according to the first embodiment of the present invention. FIGS. 2A through 2C show aberrations occurred in the lens arrangement shown in FIG. 1 at the short focal length extremity. FIGS. 3A through 3C show aberrations occurred in the lens arrangement shown in FIG. 1 at an intermediate focal length. FIGS. 4A through 4C show aberrations occurred in the lens arrangement shown in FIG. 1 at the long focal length extremity. Table 1 shows the numerical values of the first embodiment.

The zoom lens system of the first embodiment includes a negative first lens group 10, a second lens group 20 on which a diaphragm S is mounted, and a flare-cut diaphragm S', in this order from the object.

The negative first lens group 10 includes a meniscus lens element 11 having the convex surface facing toward the object, a meniscus lens element 12 having the convex surface facing toward the object, a positive meniscus lens element 1B-1 having the convex surface facing toward the object, and a rearmost lens element 1B-2 having an aspherical surface on the image-side surface thereof, in this order from the object.

The second lens group 20 includes a biconvex lens element 21, a meniscus lens element 22 having the convex surface facing toward the object, a diaphragm S, a biconcave lens element 23, and a biconvex lens element 24, in this order from the object.

Upon zooming from the short focal length extremity (wide-angle extremity) W to the long focal length extremity (telephoto extremity) T, as shown in the lens-group moving paths of FIG. 1, the negative first lens group 10 moves first toward the image and then toward the object, and the second lens group 20 and the flare-cut diaphragm S' each independently move monotonously toward the object.

TABLE 1

FNO. = 1:3.3 - 4.0 - 5.9
f = 29.00 - 40.65 - 77.00 (Zoom Ratio: 2.66)
W = 38.2 - 28.4 - 15.7
fB = 44.95 - 55.2 - 87.21
D8 = 32.48 - 18.10 - 1.20

Diaphragm Position:

1.50 behind surface No. 12

Flare-Cut Diaphragm Position

Behind surface No. 16 0.4–3.4–12.7

| Surface No. | r | d | Nd | νd |
|---|---|---|---|---|
| 1 | 51.341 | 1.20 | 1.70154 | 41.2 |
| 2 | 18.959 | 5.60 | — | — |
| 3 | 40.514 | 1.00 | 1.64850 | 53.0 |
| 4 | 20.927 | 4.22 | — | — |
| 5 | 33.704 | 4.02 | 1.78472 | 25.7 |
| 6 | 102.710 | 0.20 | — | — |
| 7 | 93.259 | 1.80 | 1.52538 | 56.3 |
| 8* | 57.389 | D8 | — | — |
| 9 | 32.433 | 2.83 | 1.61272 | 58.7 |
| 10 | −1700.364 | 0.10 | — | — |
| 11 | 21.428 | 3.08 | 1.61405 | 55.0 |
| 12 | 80.609 | 2.83 | — | — |
| 13 | −143.585 | 6.75 | 1.71736 | 29.5 |
| 14 | 16.357 | 1.04 | — | — |
| 15 | 29.457 | 5.00 | 1.51742 | 52.4 |
| 16 | −35.348 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 | A10 | A12 |
|---|---|---|---|---|---|---|
| 8 | 0.00 | $-0.15736 \times 10^{-4}$ | $-0.25379 \times 10^{-7}$ | $0.24583 \times 10^{-10}$ | $-0.35828 \times 10^{-12}$ | $0.33124 \times 10^{-15}$ |

[Embodiment 2]

Figure 5:
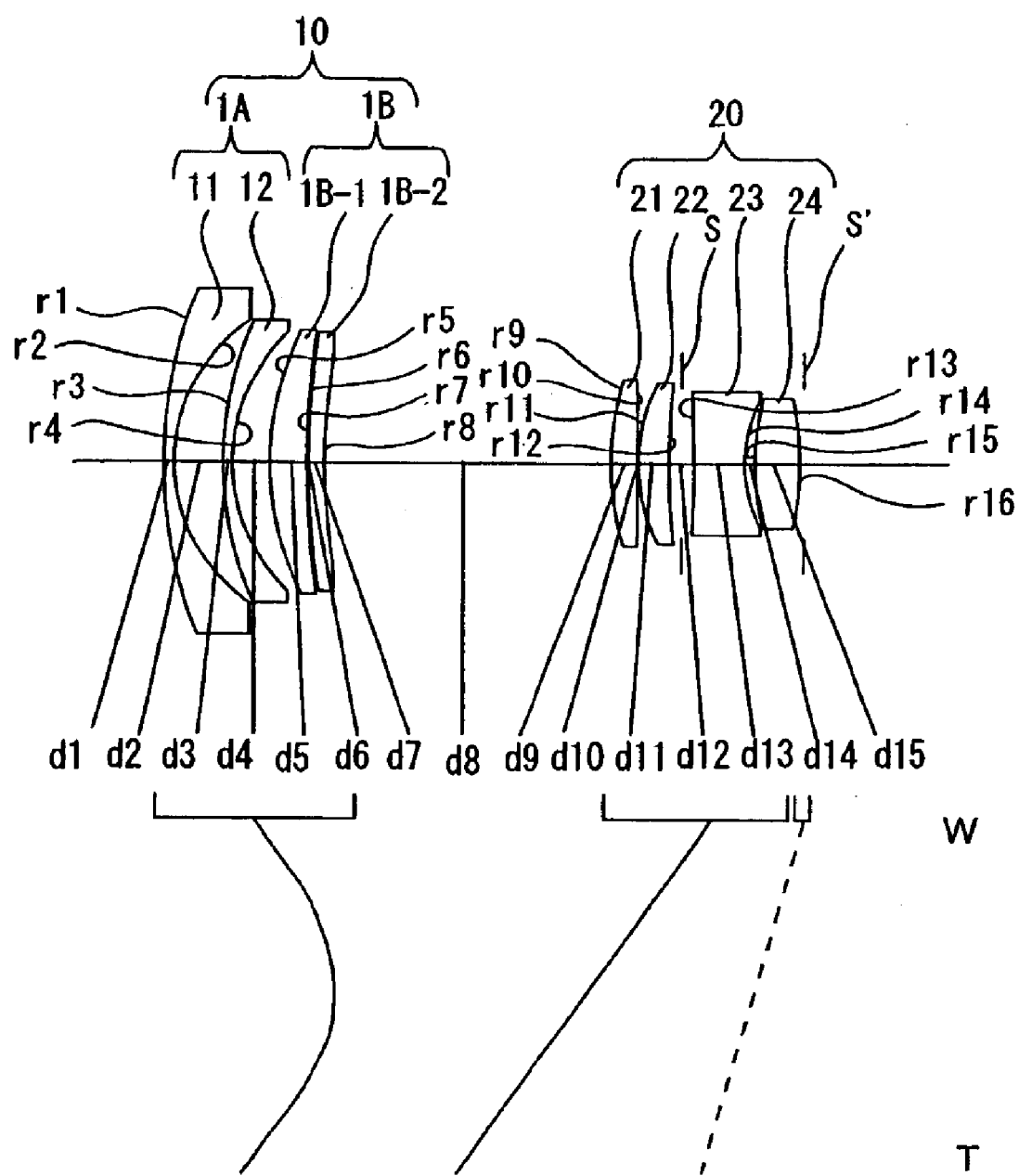
FIG. 5 is a lens arrangement of a zoom lens system according to a second embodiment of the present invention.
Figure 7A:
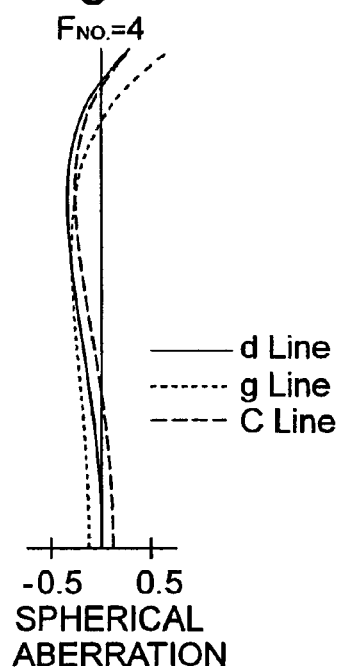
FIGS. 7A, 7B and 7C show aberrations occurred in the lens arrangement shown in FIG. 5 at an intermediate focal length.
Figure 7B:
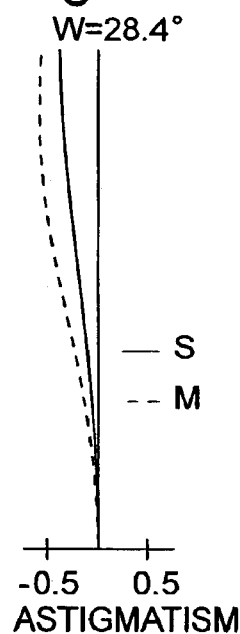
Figure 7C:
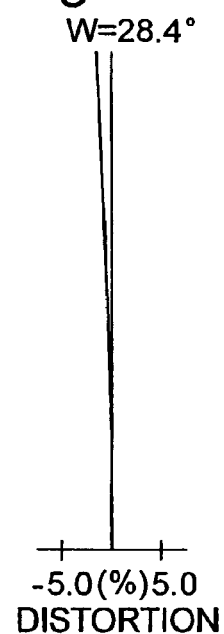
Figure 8A:
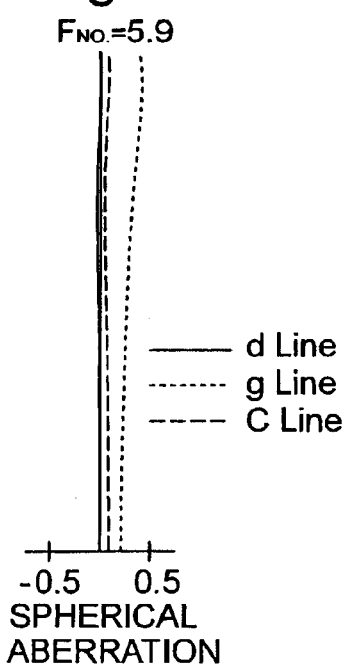
FIGS. 8A, 8B and 8C show aberrations occurred in the lens arrangement shown in FIG. 5 at the long focal length extremity.
Figure 8B:
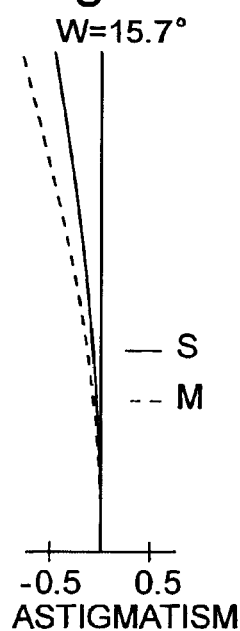
Figure 8C:
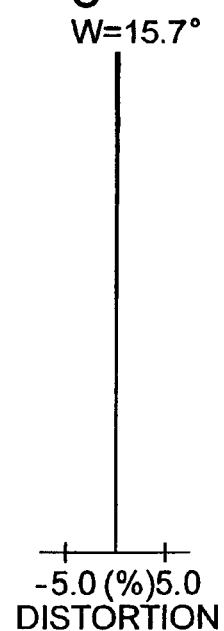

FIG. 5 is the lens arrangement of a zoom lens system according to the second embodiment of the present invention. FIGS. 6A through 6C show aberrations occurred in the lens arrangement shown in FIG. 5 at the short focal length extremity. FIGS. 7A through 7C show aberrations occurred in the lens arrangement shown in FIG. 5 at an intermediate focal length. FIGS. 8A through 8C show aberrations occurred in the lens arrangement shown in FIG. 5 at the long focal length extremity. Table 2 shows the numerical values of the second embodiment. The basic lens arrangement and the lens-group moving path of each lens group upon zooming is the same as the first embodiment.

TABLE 2

FNO. = 1:3.3 - 4.0 - 5.9
f = 29.00 - 40.65 - 77.00 (Zoom Ratio: 2.66)
W = 38.2 - 28.4 - 15.7
fB = 43.97 - 54.06 - 85.57
D8 = 31.97 - 17.83 - 1.20

Diaphragm Position:

1.50 behind surface No. 12

Flare-Cut Diaphragm Position
Behind surface No. 16 0.5–3.2–11.7

| Surface No. | r | d | Nd | νd |
|---|---|---|---|---|
| 1 | 50.964 | 1.20 | 1.72342 | 38.0 |
| 2 | 19.092 | 5.48 | — | — |
| 3 | 39.411 | 1.00 | 1.60311 | 60.7 |
| 4 | 20.339 | 4.15 | — | — |
| 5 | 32.831 | 4.11 | 1.78472 | 25.7 |
| 6 | 100.706 | 0.20 | — | — |
| 7 | 91.600 | 1.80 | 1.52538 | 56.3 |
| 8* | 52.697 | D8 | — | — |
| 9 | 30.488 | 2.98 | 1.62299 | 58.2 |
| 10 | −1378.414 | 0.10 | — | — |
| 11 | 19.895 | 3.33 | 1.56883 | 56.3 |
| 12 | 76.761 | 2.81 | — | — |
| 13 | −153.487 | 5.58 | 1.71736 | 29.5 |
| 14 | 15.603 | 1.15 | — | — |
| 15 | 29.769 | 5.00 | 1.51742 | 52.4 |
| 16 | −36.095 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 | A10 | A12 |
|---|---|---|---|---|---|---|
| 8 | 0.00 | $-0.16147 \times 10^{-4}$ | $-0.26675 \times 10^{-7}$ | $0.13573 \times 10^{-10}$ | $-0.32468 \times 10^{-12}$ | $0.18136 \times 10^{-15}$ |

Flare-Cut Diaphragm Position
Behind surface No. 16 0.93–3.8–12.8

| Surface No. | r | d | Nd | νd |
|---|---|---|---|---|
| 1 | 50.042 | 1.20 | 1.70154 | 41.2 |
| 2 | 21.212 | 5.93 | — | — |
| 3 | 65.233 | 1.00 | 1.64850 | 53.0 |
| 4 | 21.292 | 4.68 | — | — |
| 5 | 32.593 | 3.77 | 1.78472 | 25.7 |
| 6 | 74.551 | 0.10 | — | — |
| 7 | 65.153 | 2.10 | 1.52538 | 56.3 |
| 8* | 65.239 | D8 | — | — |
| 9 | 33.142 | 2.77 | 1.61272 | 58.7 |
| 10 | −2864.281 | 0.10 | — | — |
| 11 | 20.570 | 3.12 | 1.61405 | 55.0 |
| 12 | 70.039 | 3.05 | — | — |
| 13 | −176.367 | 6.69 | 1.71736 | 29.5 |
| 14 | 15.933 | 0.84 | — | — |
| 15 | 27.987 | 4.74 | 1.51742 | 52.4 |
| 16 | −37.532 | — | — | — |

*designates the aspherical surface which is rotationally symmetrical with respect to the optical axis.

Aspherical surface data (the aspherical surface coefficients not indicated are zero (0.00)):

[Embodiment 3]

Figure 9:
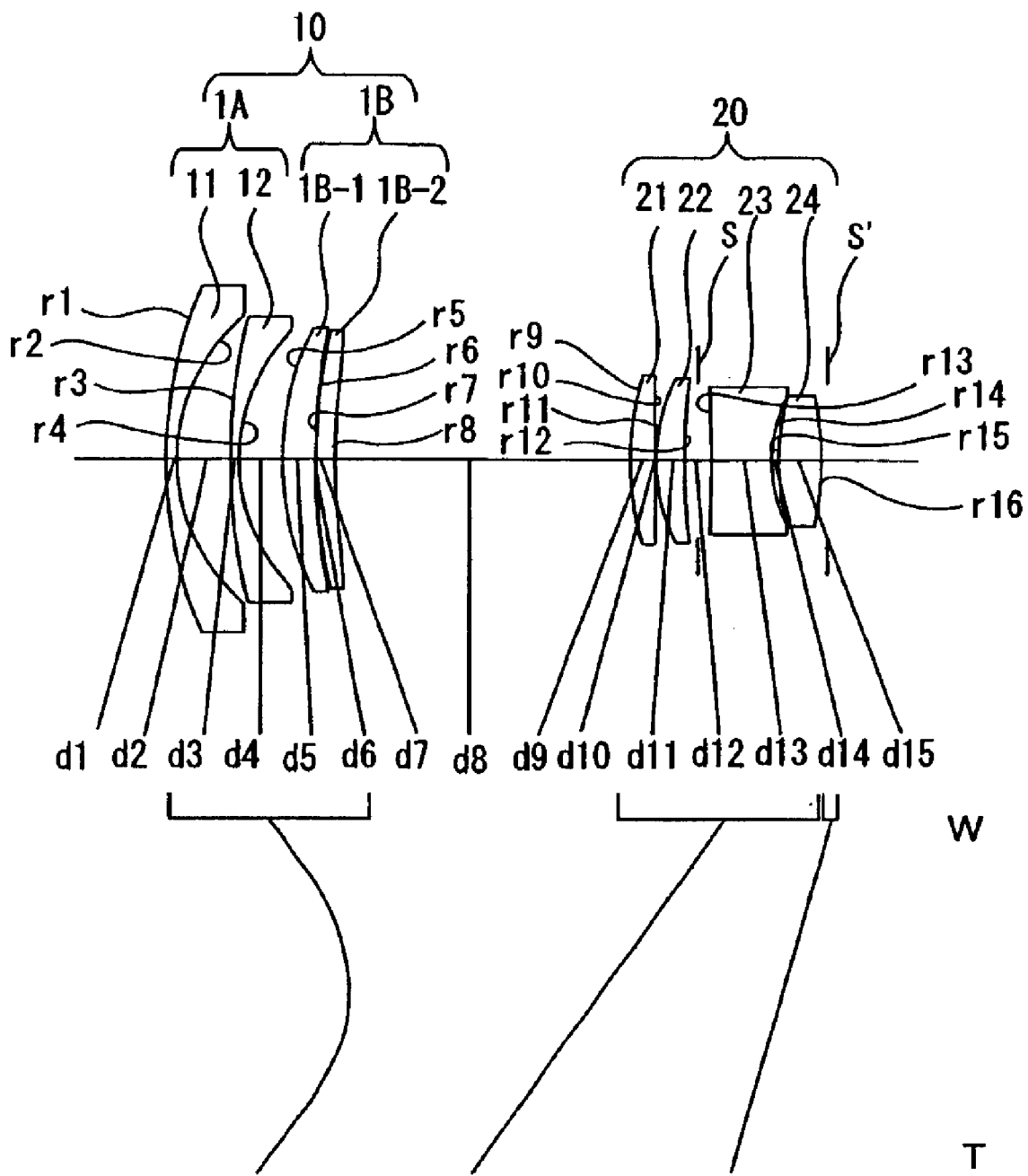
FIG. 9 is a lens arrangement of a zoom lens system according to a third embodiment of the present invention.
Figure 10A:
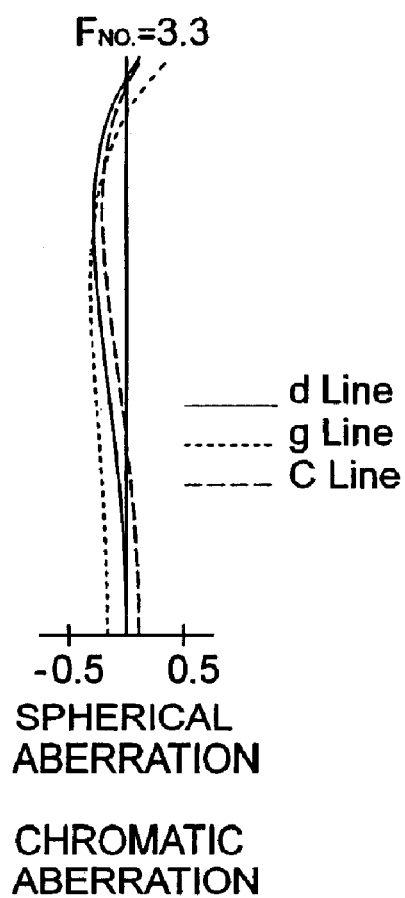
FIGS. 10A, 10B and 10C show aberrations occurred in the lens arrangement shown in FIG. 9 at the short focal length extremity.
Figure 10B:
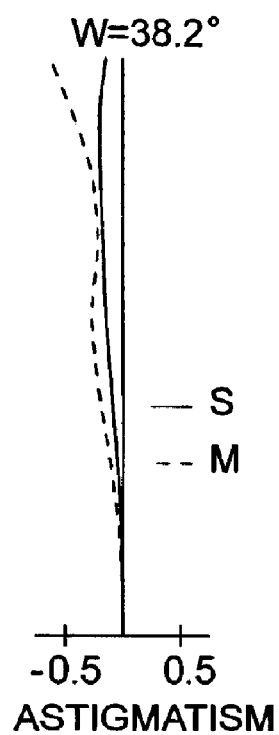
Figure 10C:
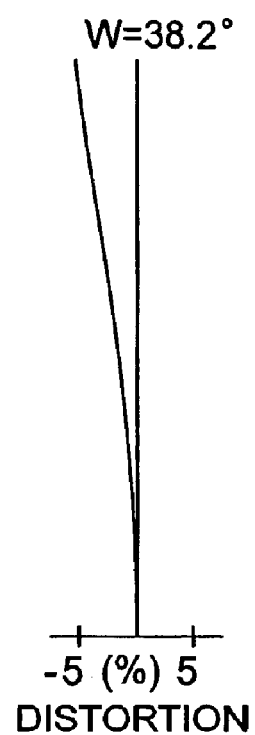
Figure 11A:
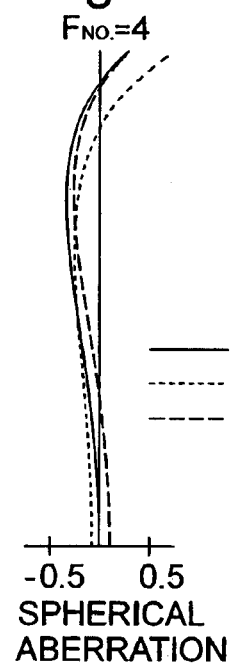
FIGS. 11A, 11B and 11C show aberrations occurred in the lens arrangement shown in FIG. 9 at an intermediate focal length.
Figure 11B:
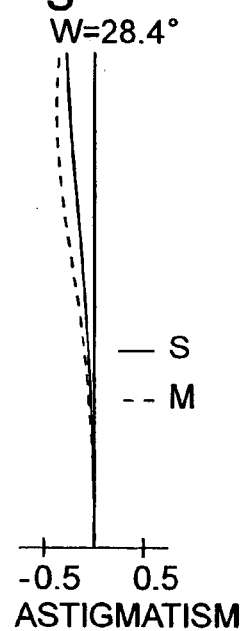
Figure 11C:
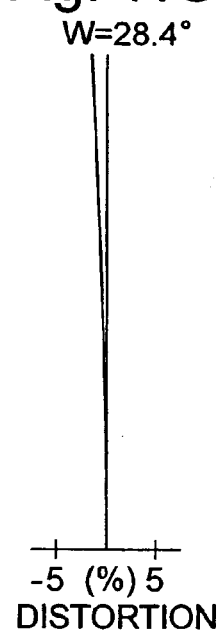
Figure 12A:
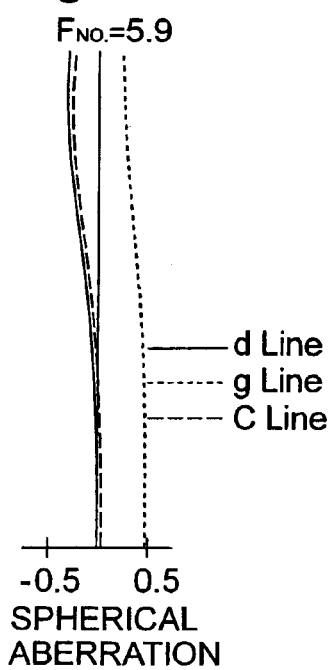
FIGS. 12A, 12B and 12C show aberrations occurred in the lens arrangement shown in FIG. 9 at the long focal length extremity.
Figure 12B:
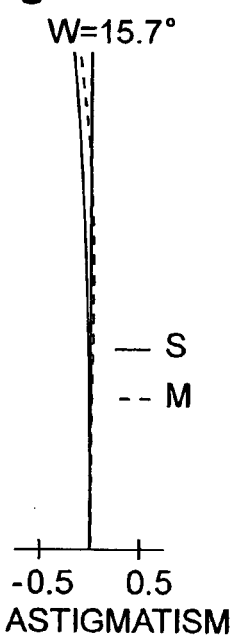
Figure 12C:
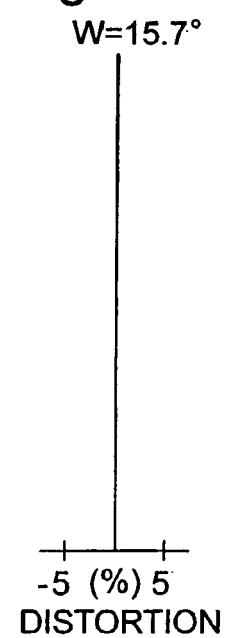

FIG. 9 is the lens arrangement of a zoom lens system according to a third embodiment of the present invention. FIGS. 10A through 10C show aberrations occurred in the lens arrangement shown in FIG. 9 at the short focal length extremity. FIGS. 11A through 11C show aberrations occurred in the lens arrangement shown in FIG. 9 at an intermediate focal length. FIGS. 12A through 12C show aberrations occurred in the lens arrangement shown in FIG. 9 at the long focal length extremity. Table 3 shows the numerical values of the third embodiment. The basic lens arrangement and the lens-group moving path of each lens group during zooming is the same as the first embodiment.

| Surf. No. | K | A4 | A6 | A8 | A10 | A12 |
|---|---|---|---|---|---|---|
| 8 | 0.00 | $-0.10293 \times 10^{-4}$ | $-0.21736 \times 10^{-7}$ | $0.65859 \times 10^{-10}$ | $-0.35672 \times 10^{-12}$ | $0.33528 \times 10^{-15}$ |

TABLE 3

FNO. = 1:3.3 - 4.0 - 5.9
f = 29.00 - 41.29 - 77.00 (Zoom Ratio: 2.66)
W = 38.2 - 28.4 - 15.7
fB = 44.43 - 55.09 - 86.07
D8 = 33.02 - 17.83 - 1.20

Diaphragm Position:

1.50 behind surface No. 12

[Embodiment 4]

Figure 13:
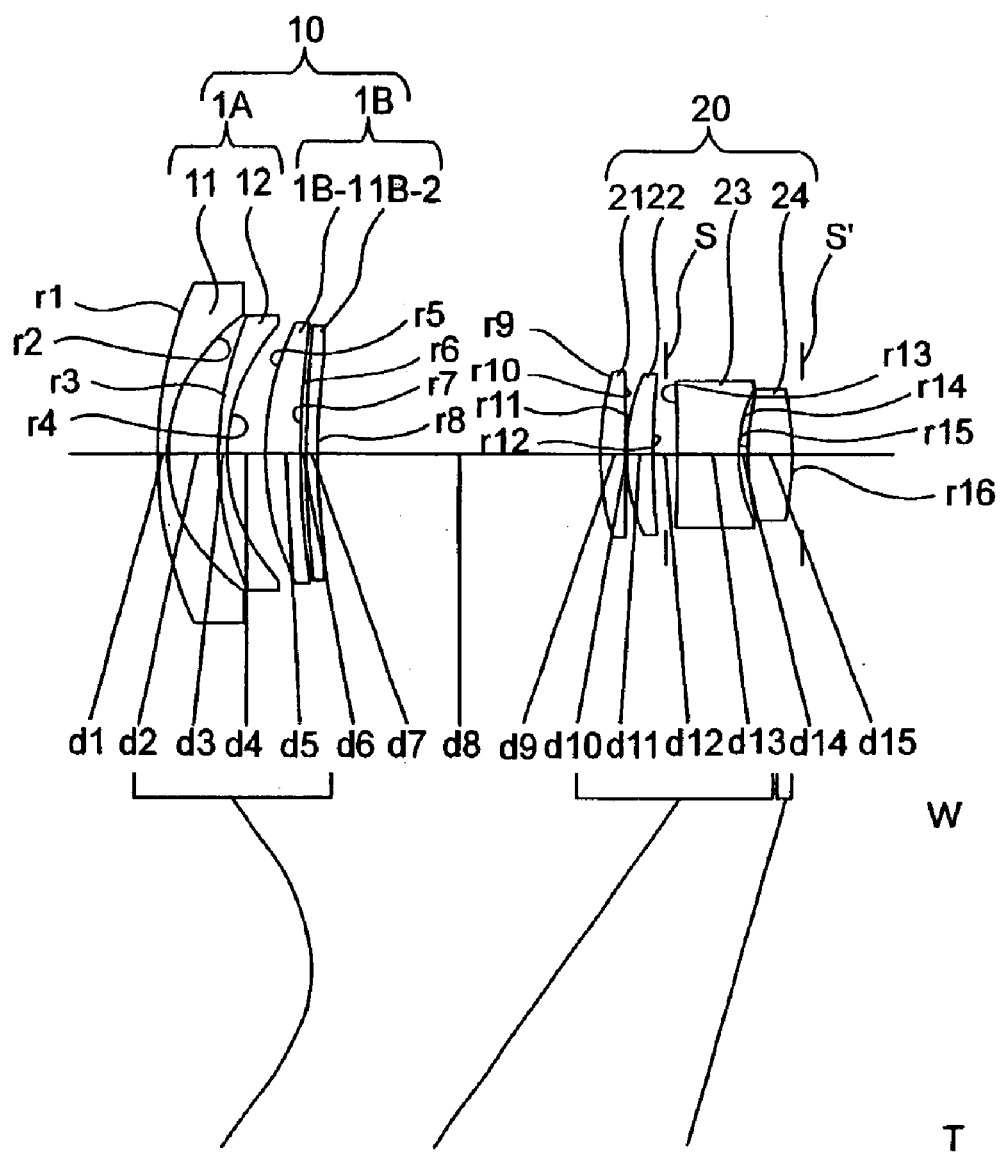
FIG. 13 is a lens arrangement of a zoom lens system according to a fourth embodiment of the present invention.
Figure 14A:
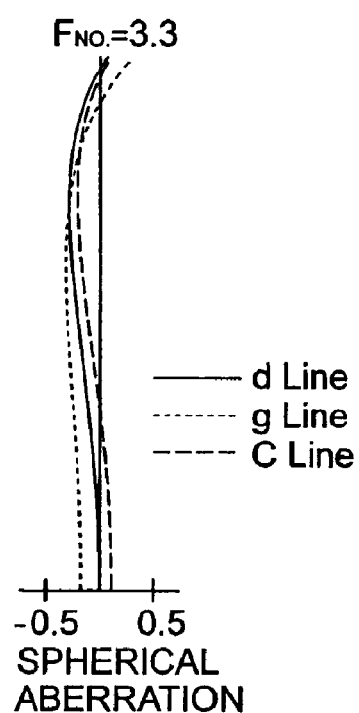
FIGS. 14A, 14B and 14C show aberrations occurred in the lens arrangement shown in FIG. 13 at the short focal length extremity.
Figure 14B:
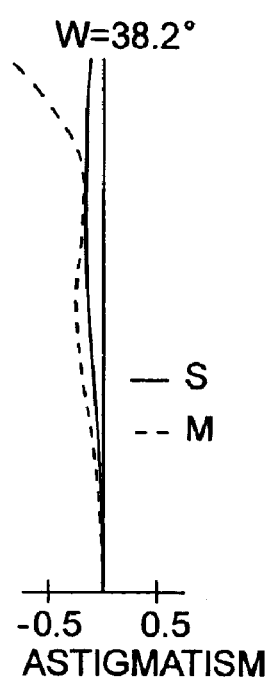
Figure 14C:
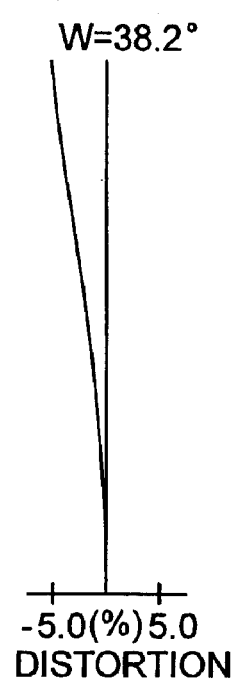
Figure 15A:
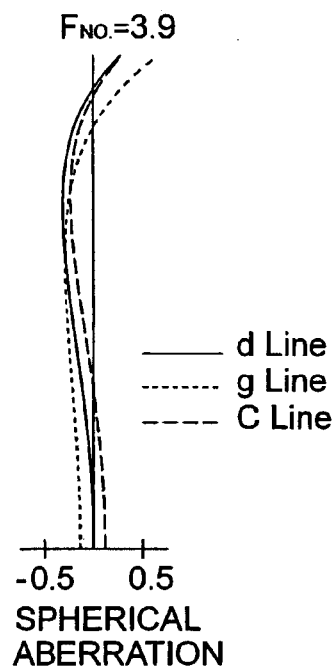
FIGS. 15A, 15B and 15C show aberrations occurred in the lens arrangement shown in FIG. 13 at an intermediate focal length.
Figure 15B:
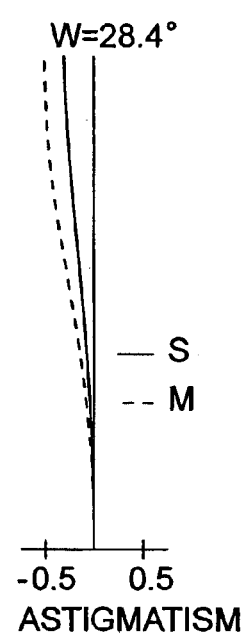
Figure 15C:
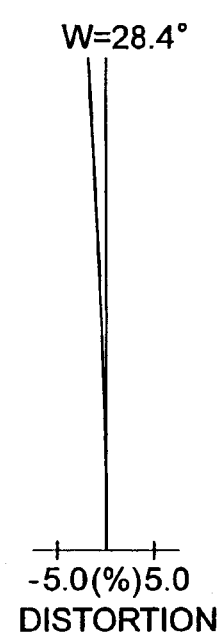
Figure 16A:
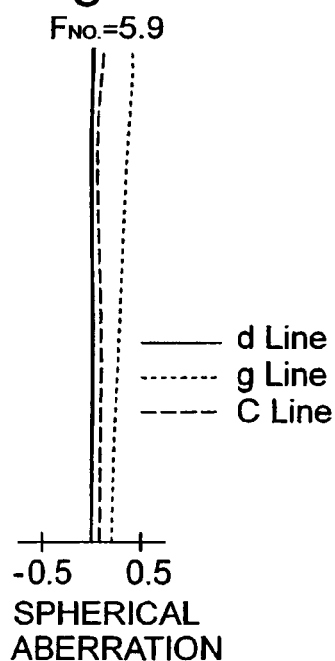
FIGS. 16A, 16B and 16C show aberrations occurred in the lens arrangement shown in FIG. 13 at the long focal length extremity.
Figure 16B:
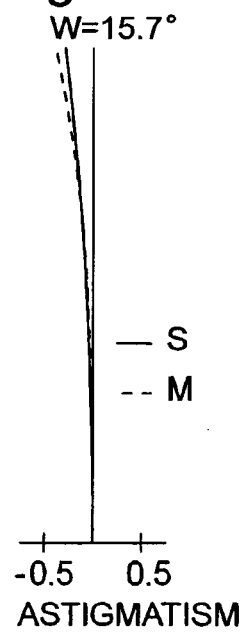
Figure 16C:
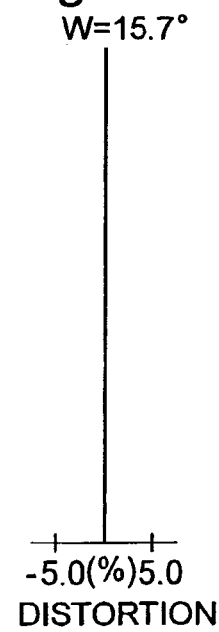

FIG. 13 is the lens arrangement of a zoom lens system according to a fourth embodiment of the present invention. FIGS. 14A through 14C show aberrations occurred in the lens arrangement shown in FIG. 13 at the short focal length extremity. FIGS. 15A through 15C show aberrations occurred in the lens arrangement shown in FIG. 13 at an intermediate focal length. FIGS. 16A through 16C show aberrations occurred in the lens arrangement shown in FIG. 13 at the long focal length extremity. Table 4 shows the numerical values of the fourth embodiment. The basic lens arrangement and the lens-group moving path of each lens group during zooming is the same as the first embodiment.

TABLE 4

FNO. = 1:3.3 - 3.9 - 5.9
f = 29.00 - 40.00 - 77.00 (Zoom Ratio: 2.66)
W = 38.2 - 28.9 - 15.7
fB = 44.75 - 54.48 - 87.20
D8 = 32.05 - 18.44 - 1.20

Diaphragm Position:
 1.50 behind surface No. 12
Flare-Cut Diaphragm Position
 Behind surface No. 16 1.5–4.2–13.0

| Surface No. | r | d | Nd | vd |
|---|---|---|---|---|
| 1 | 47.844 | 1.20 | 1.70154 | 41.2 |
| 2 | 18.707 | 5.66 | — | — |
| 3 | 39.070 | 1.00 | 1.64850 | 53.0 |
| 4 | 20.897 | 4.40 | — | — |
| 5 | 33.504 | 4.04 | 1.78472 | 25.7 |
| 6 | 101.702 | 0.70 | — | — |
| 7 | 147.257 | 1.20 | 1.52538 | 56.3 |
| 8* | 63.661 | D8 | — | — |
| 9 | 31.958 | 2.88 | 1.61272 | 58.7 |
| 10 | −1198.558 | 0.10 | — | — |
| 11 | 21.794 | 3.07 | 1.61405 | 55.0 |
| 12 | 85.230 | 2.82 | — | — |
| 13 | −136.955 | 6.93 | 1.71736 | 29.5 |
| 14 | 16.359 | 1.08 | — | — |
| 15 | 29.478 | 5.00 | 1.51742 | 52.4 |
| 16 | −35.372 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 | A10 | A12 |
|---|---|---|---|---|---|---|
| 8 | 0.00 | $-0.15075 \times 10^{-4}$ | $-0.29128 \times 10^{-7}$ | $0.48383 \times 10^{-10}$ | $-0.37091 \times 10^{-12}$ | $0.25160 \times 10^{-15}$ |

[Embodiment 5]

Figure 17:
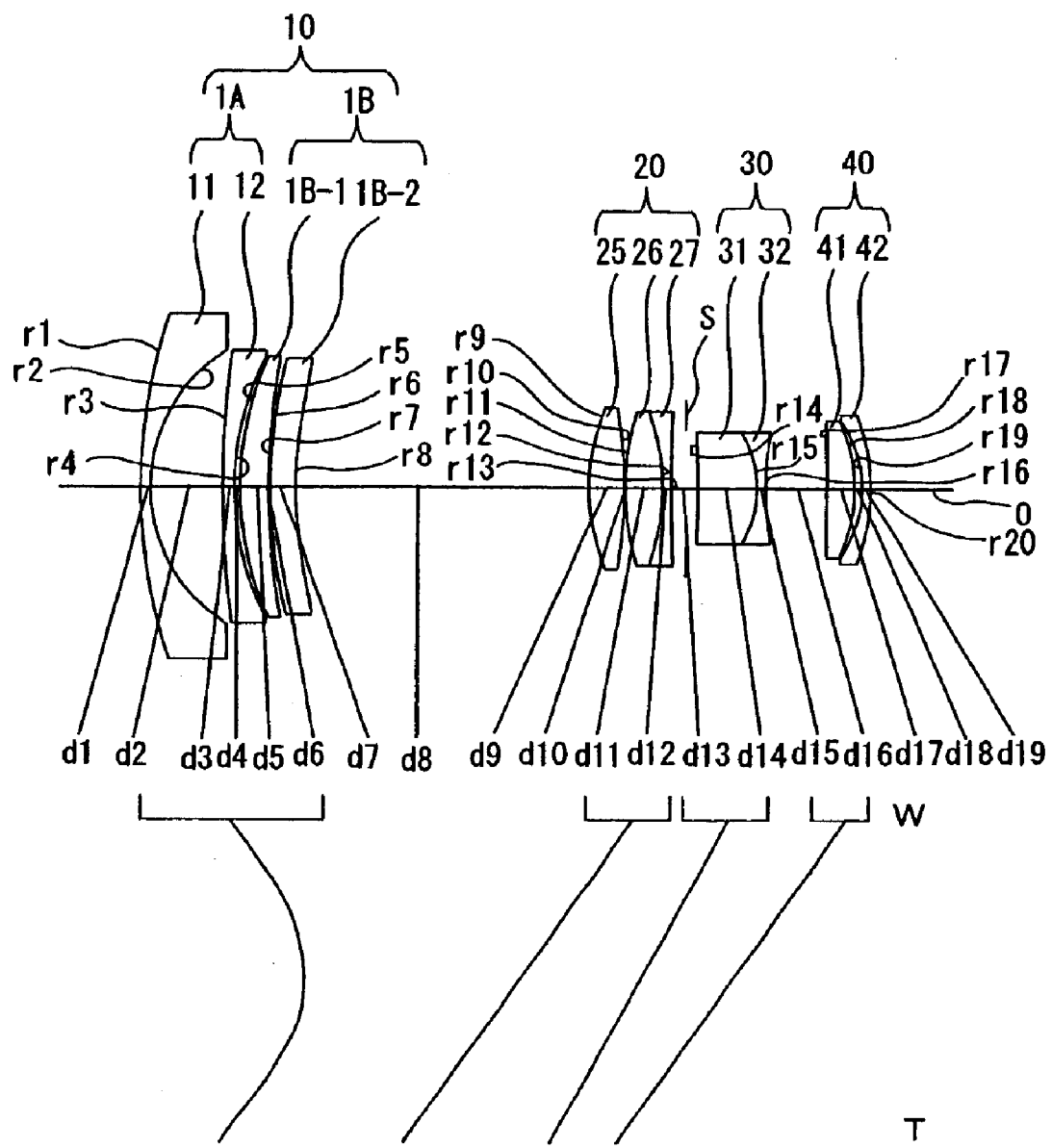
FIG. 17 is a lens arrangement of a zoom lens system according to a fifth embodiment of the present invention.
Figure 18A:
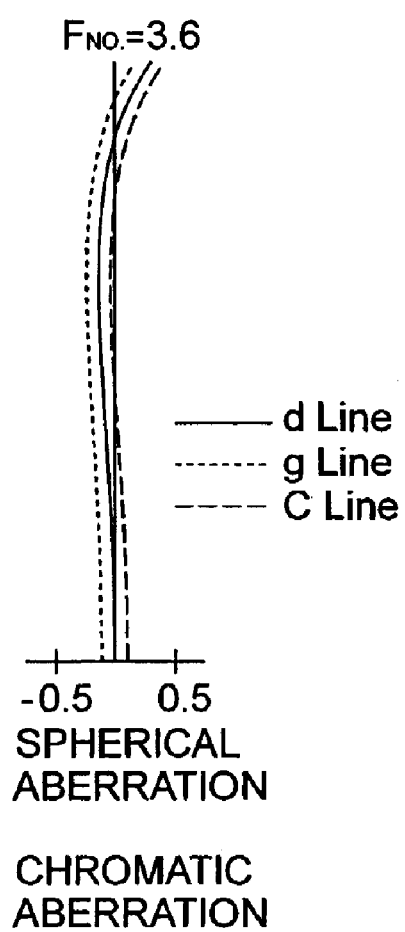
FIGS. 18A, 18B and 18C show aberrations occurred in the lens arrangement shown in FIG. 17 at the short focal length extremity.
Figure 18B:
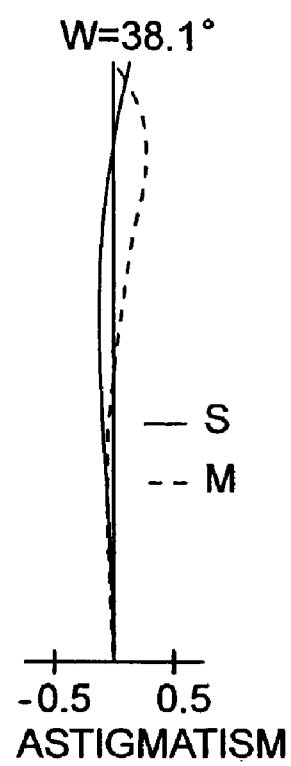
Figure 18C:
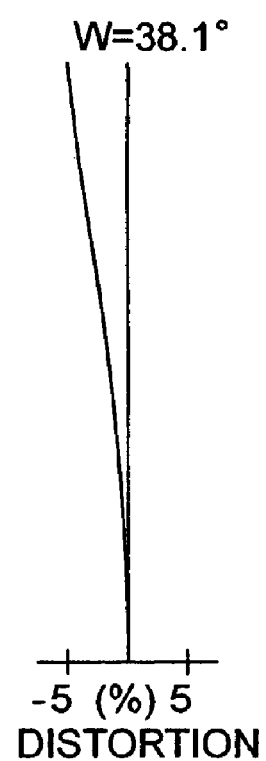
Figure 19A:
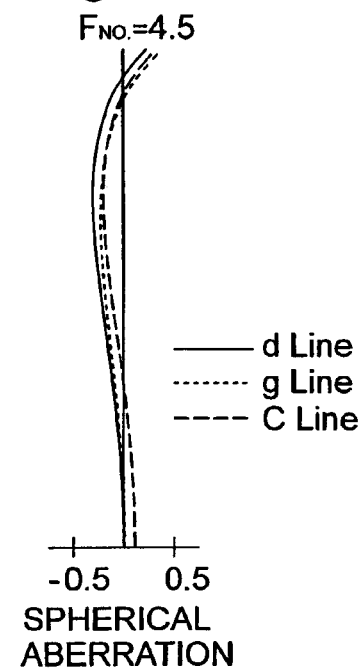
FIGS. 19A, 19B and 19C show aberrations occurred in the lens arrangement shown in FIG. 17 at an intermediate focal length.
Figure 19B:
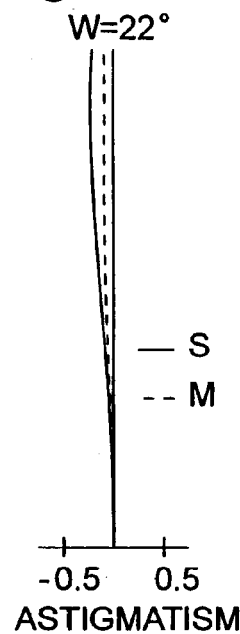
Figure 19C:
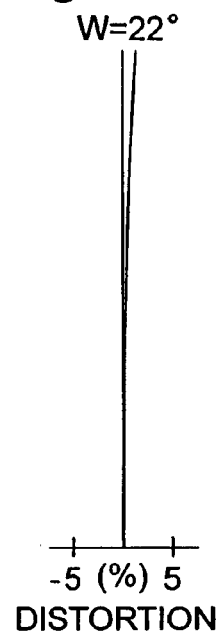
Figure 20A:
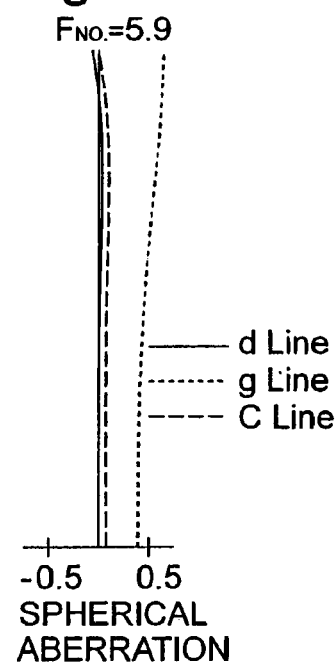
FIGS. 20A, 20B and 20C show aberrations occurred in the lens arrangement shown in FIG. 17 at the long focal length extremity.
Figure 20B:
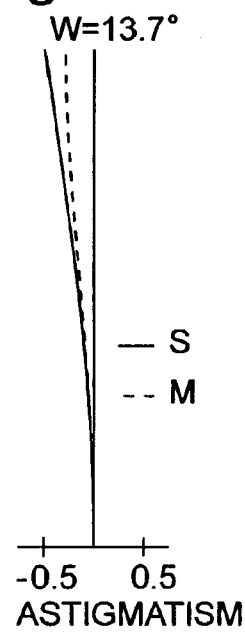
Figure 20C:
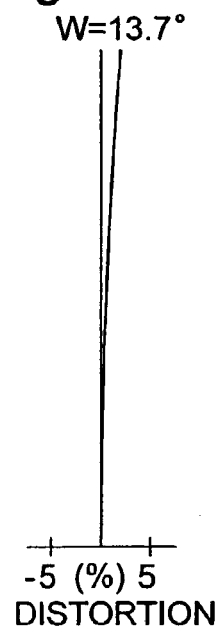

FIG. 17 is the lens arrangement of a zoom lens system according to the fifth embodiment of the present invention. FIGS. 18A through 18C show aberrations occurred in the lens arrangement shown in FIG. 17 at the short focal length extremity. FIGS. 19A through 19C show aberrations occurred in the lens arrangement shown in FIG. 17 at an intermediate focal length. FIGS. 20A through 20C show aberrations occurred in the lens arrangement shown in FIG. 17 at the long focal length extremity. Table 5 shows the numerical values of the fifth embodiment.

The zoom lens system of the fifth embodiment includes a negative first lens group 10, a second lens group 20, a diaphragm S, a third lens group 30, and a fourth lens group 40, in this order from the object. Unlike the first through fourth embodiments, a flare-cut diaphragm is not provided.

The negative first lens group 10 includes a meniscus lens element 11 having the convex surface facing toward the object, a meniscus lens element 12 having the convex surface facing toward the object, a positive meniscus lens element 1B-1 having the convex surface facing toward the object, and a rearmost lens element 1B-2 having an aspherical surface on the image-side surface thereof, in this order from the object.

The second lens group 20 includes a biconvex lens element 25, cemented lens elements having a biconvex lens element 26 and a biconcave lens element 27, in that order from the object side.

The third lens group 30 includes cemented lens elements having a meniscus lens element 31 having the convex surface facing toward the image and a biconcave lens element 32.

The fourth lens group 40 includes a biconvex lens element 41 and a meniscus lens element 42 having the convex surface facing toward the image, in this order from the object Upon zooming from the short focal length extremity (wide-angle extremity) W to the long focal length extremity (telephoto extremity) T, as shown in the lens-group moving paths of FIG. 17, the negative first lens group 10 moves first toward the image and then toward the object; and the second lens group 20, the third lens group 30 and the fourth lens group 40 each independently move monotonously toward the object.

TABLE 5

FNO. = 1:3.6 - 4.5 - 5.9
f = 29.00 - 52.93 - 87.00 (Zoom Ratio: 3.00)
W = 38.1 - 22.0 - 13.7
fB = 36.70 - 52.46 - 73.02
D8 = 35.76 - 12.08 - 1.35
D13 = 3.30 - 6.38 - 10.03
D16 = 7.48 - 5.27 - 1.36

Diaphragm Position:
 1.5 behind surface No. 14

| Surface No. | r | d | Nd | vd |
|---|---|---|---|---|
| 1 | 65.072 | 1.20 | 1.60311 | 60.7 |
| 2 | 19.951 | 8.83 | — | — |
| 3 | 116.727 | 1.50 | 1.67790 | 55.3 |
| 4 | 35.217 | 0.70 | — | — |
| 5 | 38.618 | 3.50 | 1.84666 | 23.8 |
| 6 | 91.125 | 0.20 | — | — |
| 7 | 63.982 | 3.00 | 1.58547 | 29.9 |
| 8* | 47.372 | D8 | — | — |
| 9 | 25.175 | 4.45 | 1.58913 | 61.2 |
| 10 | −57.616 | 0.10 | — | — |
| 11 | 31.872 | 4.64 | 1.51742 | 52.4 |
| 12 | −28.042 | 1.00 | 1.80518 | 25.4 |
| 13 | 236.003 | D13 | — | — |
| 14 | −108.075 | 7.29 | 1.80518 | 25.4 |
| 15 | −14.004 | 1.00 | 1.80610 | 40.9 |
| 16 | 37.963 | D16 | — | — |
| 17 | 4509.489 | 3.40 | 1.77250 | 49.6 |
| 18 | −20.247 | 0.90 | — | — |
| 19 | −15.178 | 1.00 | 1.80518 | 25.4 |
| 20 | −26.738 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 8 | 0.00 | $-0.69482 \times 10^{-5}$ | $-0.30673 \times 10^{-8}$ | $-0.35008 \times 10^{-10}$ |

[Embodiment 6]

Figure 21:
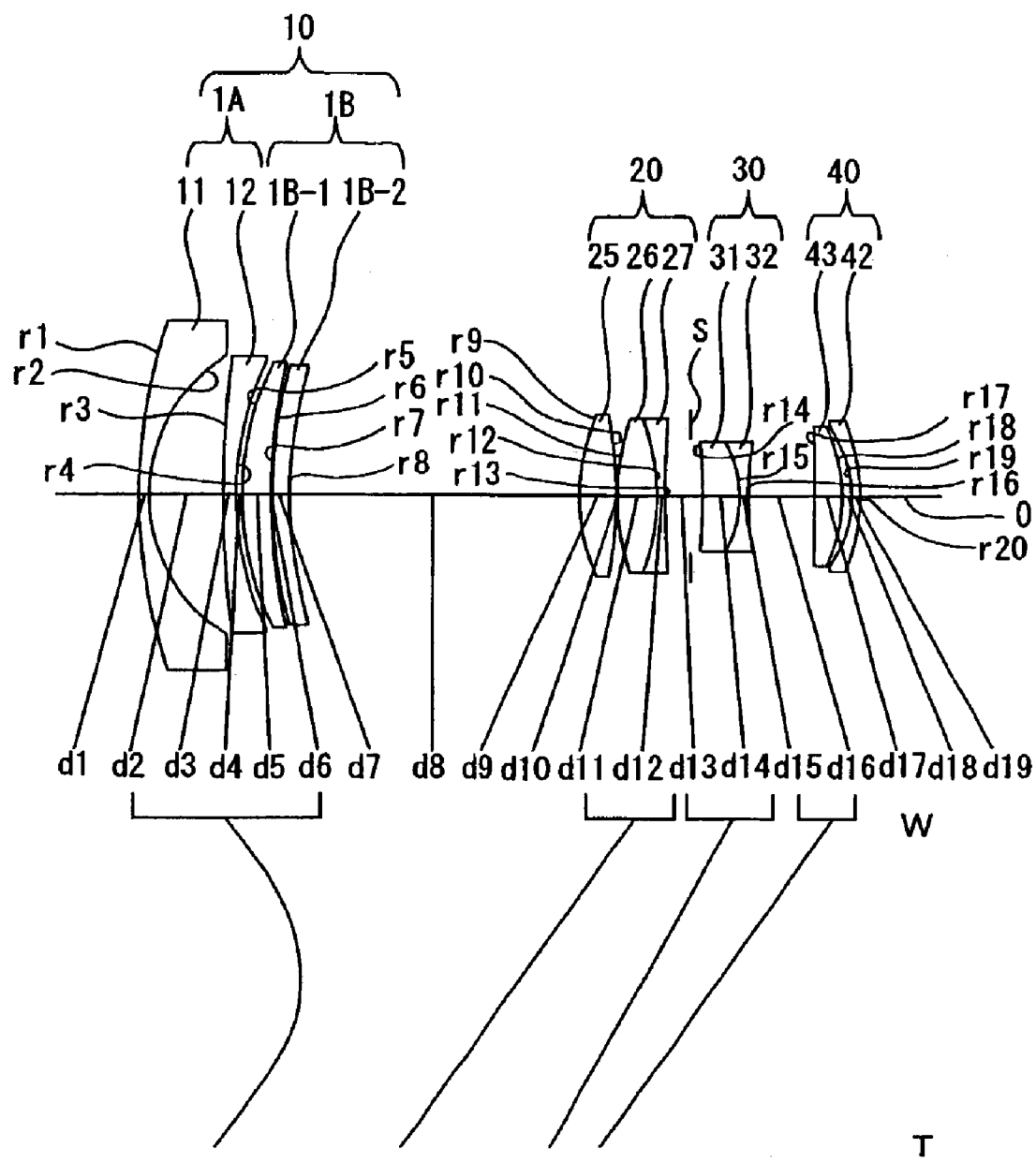
FIG. 21 is a lens arrangement of a zoom lens system according to a sixth embodiment of the present invention.
Figure 22A:
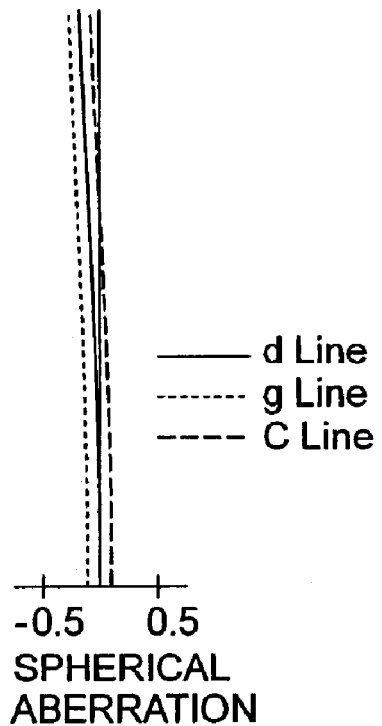
FIGS. 22A, 22B and 22C show aberrations occurred in the lens arrangement shown in FIG. 21 at the short focal length extremity.
Figure 22B:
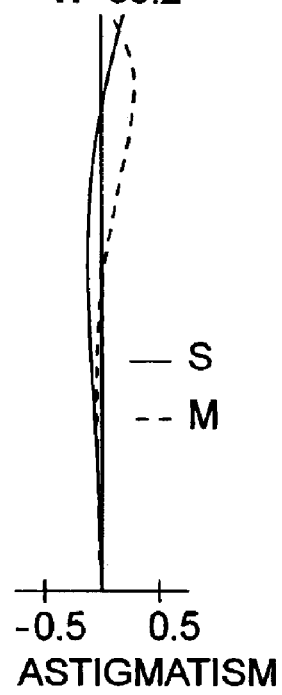
Figure 22C:
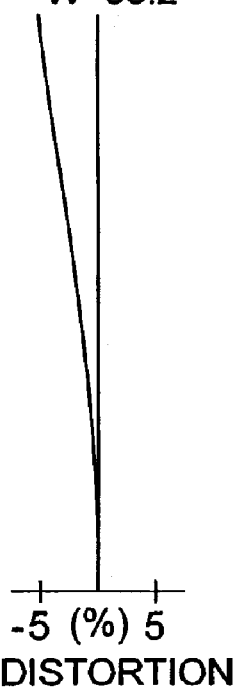
Figure 23A:
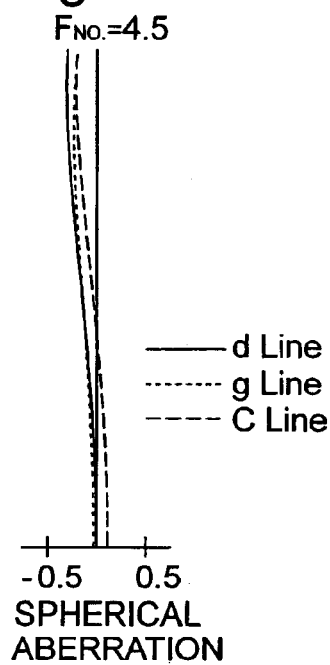
FIGS. 23A, 23B and 23C show aberrations occurred in the lens arrangement shown in FIG. 21 at an intermediate focal length.
Figure 23B:
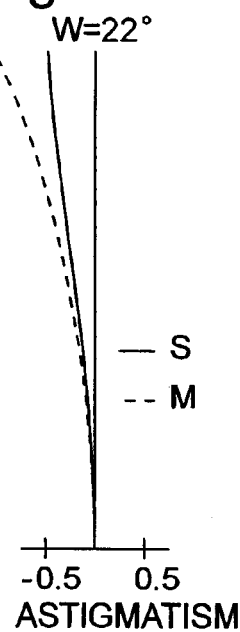
Figure 23C:
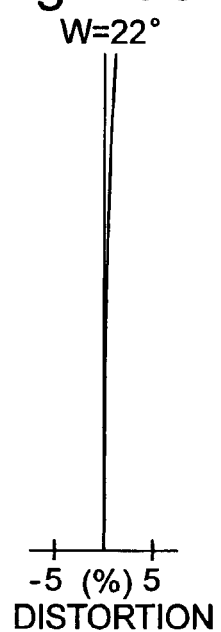
Figure 24A:
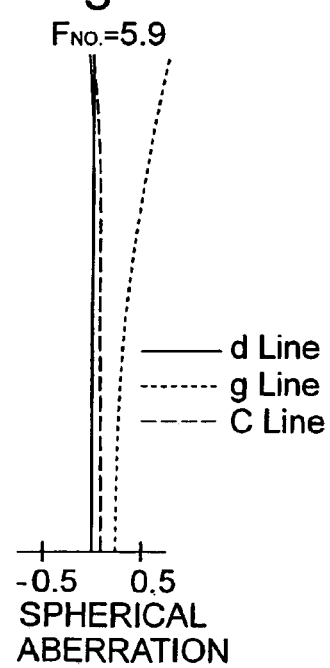
FIGS. 24A, 24B and 24C show aberrations occurred in the lens arrangement shown in FIG. 21 at the long focal length extremity.
Figure 24B:
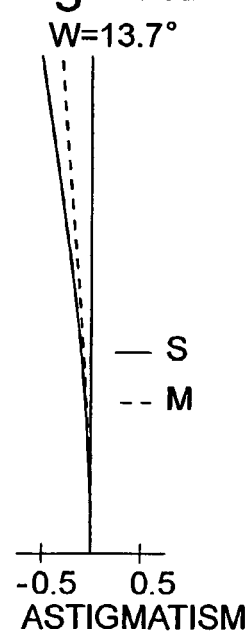
Figure 24C:
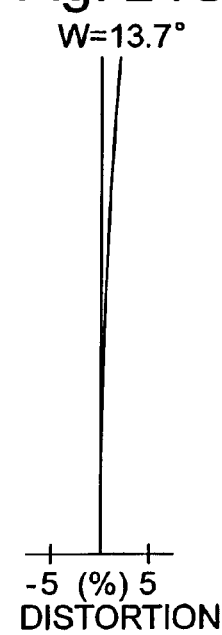

FIG. 21 is the lens arrangement of a zoom lens system according to a sixth embodiment of the present invention. FIGS. 22A through 22C show aberrations occurred in the lens arrangement shown in FIG. 21 at the short focal length extremity. FIGS. 23A through 23C show aberrations occurred in the lens arrangement shown in FIG. 21 at an intermediate focal length. FIGS. 24A through 24C show aberrations occurred in the lens arrangement shown in FIG. 21 at the long focal length extremity. Table 6 shows the numerical values of the sixth embodiment.

The zoom lens system of the sixth embodiment is the same as the fifth embodiment except that the lens element 43 of the fourth lens group 40 is a meniscus lens element having the convex surface facing toward the image. The lens-group moving paths of each lens group upon zooming is the same as the fifth embodiment.

TABLE 6

FNO. = 1:3.5 - 4.5 - 5.9
f = 29.00 - 52.89 - 87.00 (Zoom Ratio: 3.00)
W = 38.2 - 22.0 - 13.7
fB = 36.70 - 52.90 - 73.70
D8 = 34.92 - 11.67 - 1.35
D13 = 4.57 - 7.59 - 11.24
D16 = 8.01 - 4.99 - 1.34

Diaphragm Position:

1.5 behind surface No. 14

| Surface No. | r | d | Nd | vd |
|---|---|---|---|---|
| 1 | 66.274 | 1.20 | 1.60311 | 60.7 |
| 2 | 20.174 | 8.86 | — | — |
| 3 | 128.303 | 1.50 | 1.67790 | 55.3 |
| 4 | 38.046 | 0.70 | — | — |
| 5 | 35.956 | 3.50 | 1.84666 | 23.8 |
| 6 | 69.757 | 0.20 | — | — |
| 7 | 60.695 | 2.00 | 1.52538 | 56.3 |
| 8* | 44.562 | D8 | — | — |
| 9 | 25.001 | 4.46 | 1.58913 | 61.2 |
| 10 | −55.016 | 0.10 | — | — |
| 11 | 31.210 | 4.65 | 1.51742 | 52.4 |
| 12 | −27.089 | 1.00 | 1.80518 | 25.4 |
| 13 | 167.329 | D13 | — | — |
| 14 | −81.962 | 4.48 | 1.80518 | 25.4 |
| 15 | −14.000 | 1.00 | 1.80610 | 40.9 |
| 16 | 41.231 | D16 | — | — |
| 17 | −4585.308 | 3.37 | 1.77250 | 49.6 |
| 18 | −20.293 | 1.15 | — | — |
| 19 | −15.095 | 1.00 | 1.80518 | 25.4 |
| 20 | −24.749 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 8 | 0.00 | $-0.58550 \times 10^{-5}$ | $-0.20789 \times 10^{-8}$ | $-0.27939 \times 10^{-10}$ |

[Embodiment 7]

Figure 25:
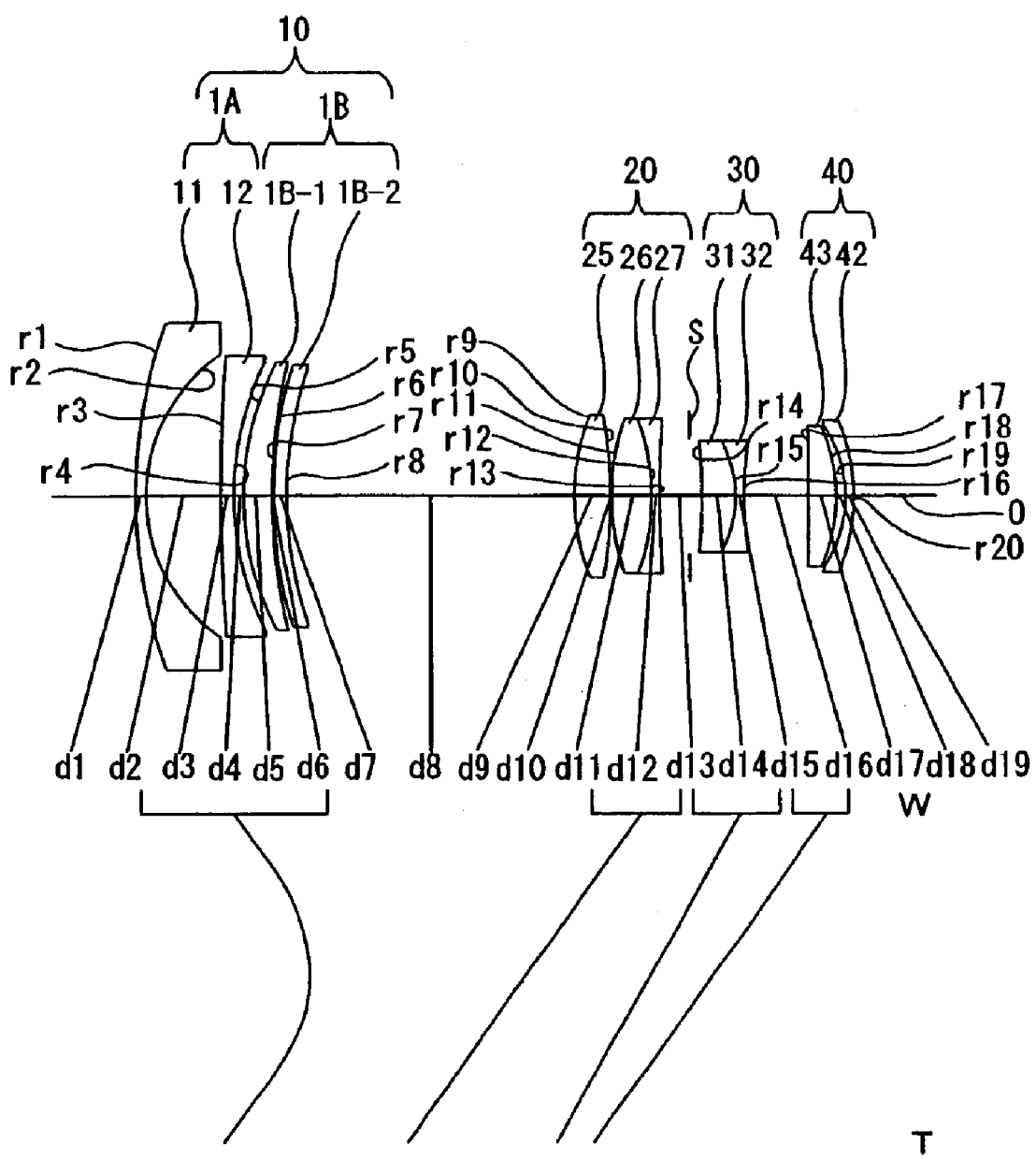
FIG. 25 is a lens arrangement of a zoom lens system according to a seventh embodiment of the present invention.
Figure 26A:
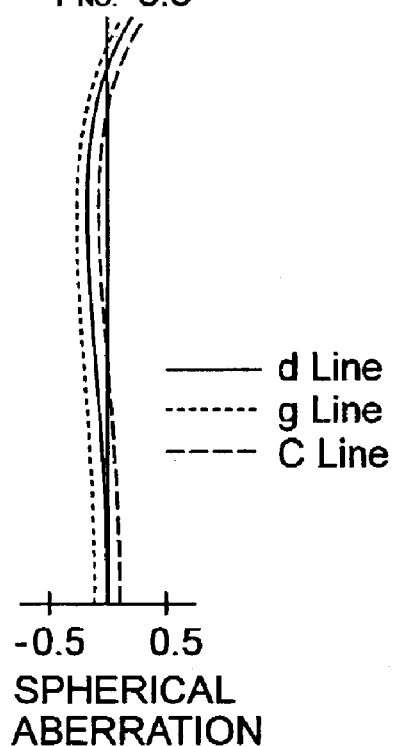
FIGS. 26A, 26B and 26C show aberrations occurred in the lens arrangement shown in FIG. 25 at the short focal length extremity.
Figure 26B:
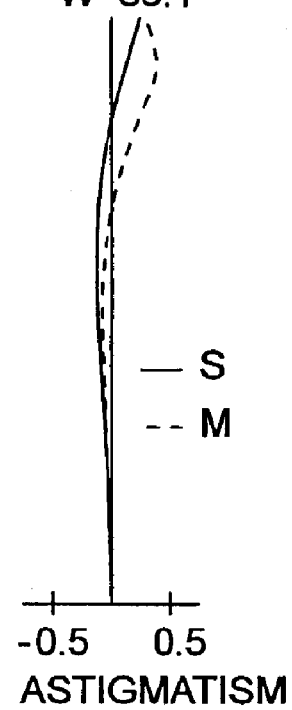
Figure 26C:
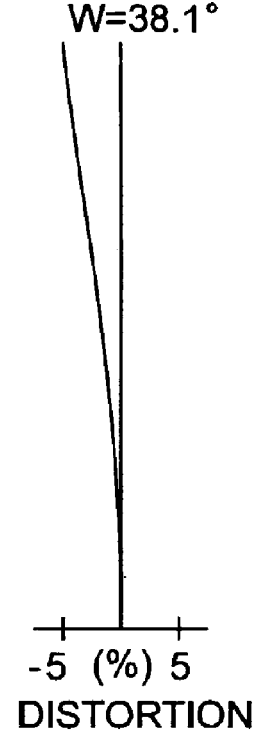
Figure 27A:
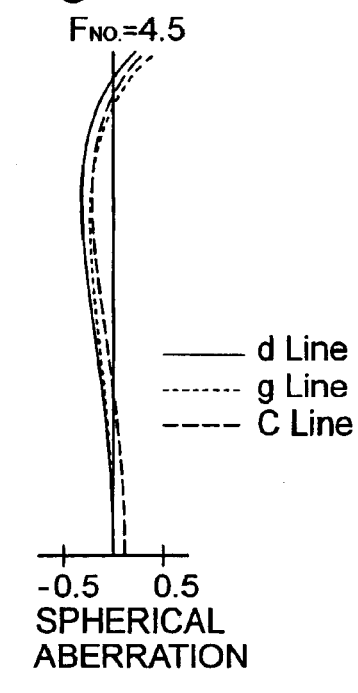
FIGS. 27A, 27B and 27C show aberrations occurred in the lens arrangement shown in FIG. 25 at an intermediate focal length.
Figure 27B:
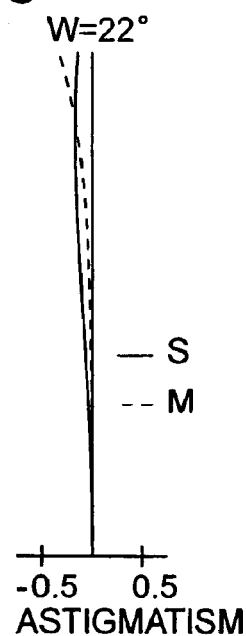
Figure 27C:
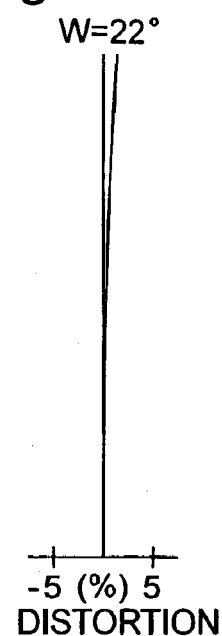
Figure 28A:
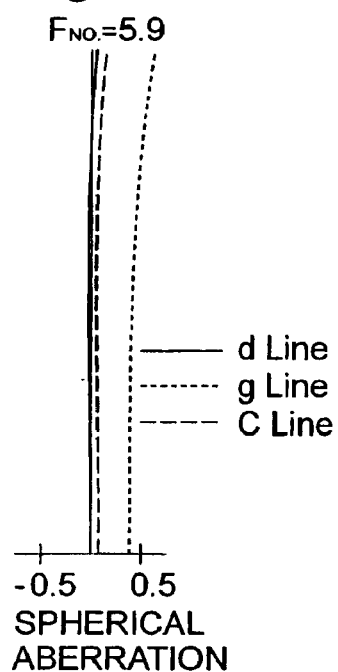
FIGS. 28A, 28B and 28C show aberrations occurred in the lens arrangement shown in FIG. 25 at the long focal length extremity.
Figure 28B:
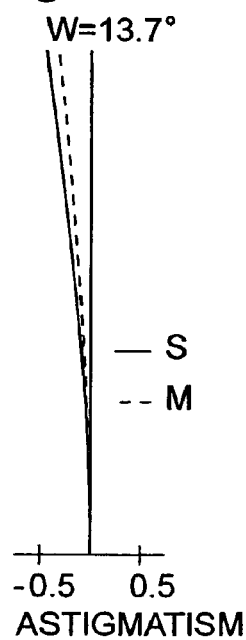
Figure 28C:
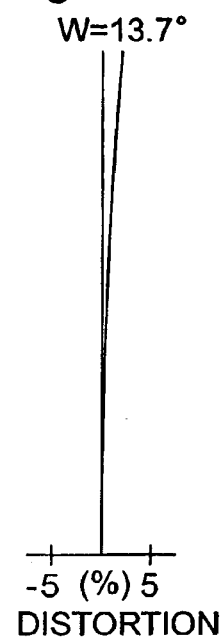

FIG. 25 is the lens arrangement of a zoom lens system according to the seventh embodiment of the present invention. FIGS. 26A through 26C show aberrations occurred in the lens arrangement shown in FIG. 25 at the short focal length extremity. FIGS. 27A through 27C show aberrations occurred in the lens arrangement shown in FIG. 25 at an intermediate focal length. FIGS. 28A through 28C show aberrations occurred in the lens arrangement shown in FIG. 25 at the long focal length extremity. Table 7 shows the numerical values of the seventh embodiment.

The zoom lens system of the seventh embodiment is the same as the sixth embodiment except that the rearmost lens element 1B-2 is provided with an aspherical surface on the object-side surface thereof. The lens-group moving paths of each lens group upon zooming is the same as the sixth embodiment.

TABLE 7

FNO. = 1:3.5 - 4.5 - 5.9
f = 29.00 - 52.85 - 87.00 (Zoom Ratio: 3.00)
W = 38.1 - 22.0 - 13.7
fB = 36.70 - 52.79 - 73.77
D8 = 34.82 - 11.65 - 1.35
D13 = 5.07 - 8.08 - 11.70
D16 = 7.91 - 5.32 - 1.34

Diaphragm Position:

1.5 mm behind surface No. 14

| Surface No. | r | d | Nd | vd |
|---|---|---|---|---|
| 1 | 62.862 | 1.20 | 1.60311 | 60.7 |
| 2 | 20.959 | 8.91 | — | — |
| 3 | 218.908 | 1.50 | 1.67790 | 55.3 |
| 4 | 36.179 | 1.18 | — | — |
| 5 | 34.154 | 3.50 | 1.84666 | 23.8 |
| 6 | 69.896 | 0.20 | — | — |
| 7* | 61.265 | 1.50 | 1.58547 | 29.9 |
| 8 | 46.220 | D8 | — | — |
| 9 | 25.294 | 4.44 | 1.58913 | 61.2 |
| 10 | −54.811 | 0.10 | — | — |
| 11 | 30.668 | 4.64 | 1.51742 | 52.4 |
| 12 | −28.088 | 1.00 | 1.80518 | 25.4 |
| 13 | 175.833 | D13 | — | — |
| 14 | −67.968 | 4.05 | 1.80518 | 25.4 |
| 15 | −14.000 | 1.00 | 1.80610 | 40.9 |
| 16 | 42.304 | D16 | — | — |
| 17 | −743.698 | 3.37 | 1.77250 | 49.6 |
| 18 | −20.010 | 1.14 | — | — |
| 19 | −14.826 | 1.00 | 1.80518 | 25.4 |
| 20 | −23.413 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 7 | 0.00 | $0.30142 \times 10^{-5}$ | $-0.72479 \times 10^{-10}$ | $0.87347 \times 10^{-11}$ |

[Embodiment 8]

Figure 29:
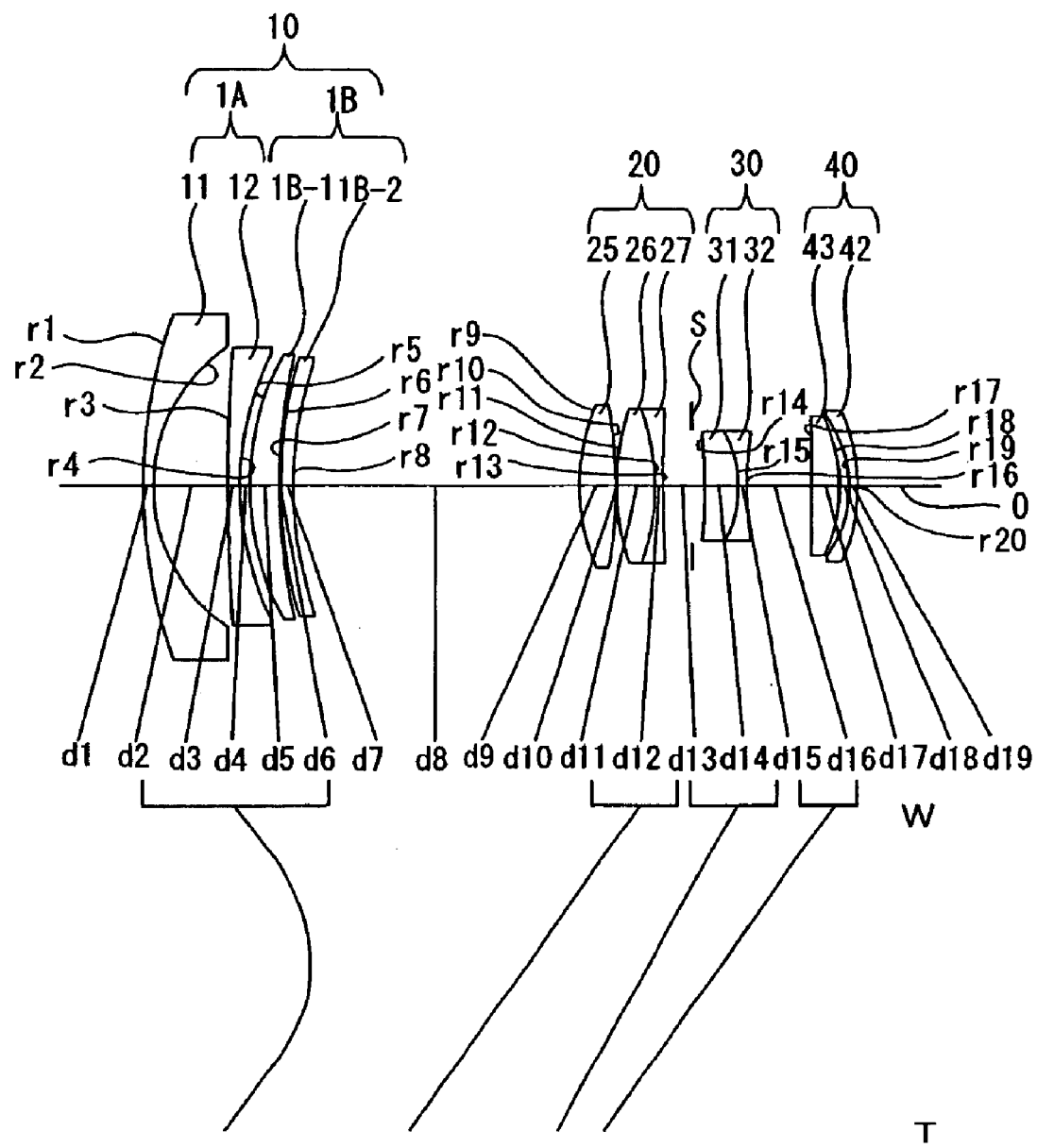
FIG. 29 is a lens arrangement of a zoom lens system according to an eighth embodiment of the present invention.

FIG. 29 is the lens arrangement of a zoom lens system according to an eighth embodiment of the present invention. FIGS. 30A through 30C show aberrations occurred in the lens arrangement shown in FIG. 29 at the short focal length extremity. FIGS. 31A through 31C show aberrations occurred in the lens arrangement shown in FIG. 29 at an intermediate focal length. FIGS. 32A through 32C show aberrations occurred in the lens arrangement shown in FIG. 29 at the long focal length extremity. Table 8 shows the numerical values of the eighth embodiment.

The zoom lens system of the eighth embodiment and the lens-group moving path of each lens group upon zooming is the same as the seventh embodiment.

TABLE 8

FNO. = 1:3.5 - 4.5 - 5.9
f = 29.00 - 52.85 - 87.00 (Zoom Ratio: 3.00)
W = 38.1 - 22.0 - 13.7
fB = 36.70 - 52.79 - 73.37
D8 = 34.82 - 11.65 - 1.35
D13 = 5.07 - 8.08 - 11.70
D16 = 7.91 - 5.32 - 1.34

Diaphragm Position:
1.5 behind surface No. 14

| Surface No. | r | d | Nd | νd |
|---|---|---|---|---|
| 1 | 62.862 | 1.20 | 1.60311 | 60.7 |
| 2 | 20.959 | 8.91 | — | — |
| 3 | 218.908 | 1.50 | 1.67790 | 55.3 |
| 4 | 36.179 | 1.18 | — | — |
| 5 | 34.154 | 3.50 | 1.84666 | 23.8 |
| 6 | 69.896 | 0.20 | — | — |
| 7* | 61.265 | 1.50 | 1.58547 | 29.9 |
| 8 | 46.220 | D8 | — | — |
| 9 | 25.294 | 4.44 | 1.58913 | 61.2 |
| 10 | -54.811 | 0.10 | — | — |
| 11 | 30.668 | 4.64 | 1.51742 | 52.4 |
| 12 | -28.088 | 1.00 | 1.80518 | 25.4 |
| 13 | 175.833 | D13 | — | — |
| 14 | -67.968 | 4.05 | 1.80518 | 25.4 |
| 15 | -14.000 | 1.00 | 1.80610 | 40.9 |
| 16 | 42.304 | D16 | — | — |
| 17 | -743.698 | 3.37 | 1.77250 | 49.6 |
| 18 | -20.010 | 1.14 | — | — |
| 19 | -14.826 | 1.00 | 1.80518 | 25.4 |
| 20 | -23.413 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 7 | 0.00 | $0.30142 \times 10^{-5}$ | $-0.72479 \times 10^{-10}$ | $0.87347 \times 10^{-11}$ |

Table 9 shows the numerical values of each condition for each embodiment.

TABLE 9

| | Embod. 1 | Embod. 2 | Embod. 3 | Embod. 4 |
|---|---|---|---|---|
| Cond. (1) | 0.14 | 0.17 | 0.004 | 0.19 |
| Cond. (2) | 0.062 | 0.062 | 0.072 | 0.041 |
| Cond. (3) | 0.007 | 0.007 | 0.003 | 0.024 |
| Cond. (4) | -0.43 | -0.44 | -0.29 | -0.40 |
| Cond. (5) | 1.6485 | 1.60311 | 1.6485 | 1.6485 |
| | Embod. 5 | Embod. 6 | Embod. 7 | Embod. 8 |
| Cond. (1) | 0.116 | 0.116 | 0.115 | 0.115 |
| Cond. (2) | 0.103 | 0.069 | 0.052 | 0.052 |
| Cond. (3) | 0.007 | 0.007 | 0.007 | 0.007 |
| Cond. (4) | -0.28 | -0.23 | -0.15 | -0.15 |
| Cond. (5) | 1.60311 | 1.60311 | 1.60311 | 1.60311 |

As can be understood from the Table 9, each embodiment satisfies each condition of the present invention, and as can be understood from the drawings, the various aberrations can be adequately corrected.

According to the above description, a miniaturized and low-cost zoom lens system having a half angle-of-view of 38° at the short focal length extremity, and having a zoom ratio of approximately 3 can be obtained.

What is claimed is:

1. A zoom lens system comprising at least two lens groups, wherein a negative first lens group is positioned at the most object-side of said zoom lens system;

wherein said negative first lens group comprises a negative sub-lens group and a positive sub-lens group, in this order from an object;

wherein said positive sub-lens group comprises a positive lens element and a rearmost lens element of said negative first lens group, in this order from said object;

wherein said rearmost lens element comprises a plastic lens element having at least one aspherical surface; and wherein said zoom lens system satisfies the following conditions:

$|f_1/f_{1B-2}|<0.3$ $0.02<D_{1B-2}/fw<0.2$ $0.001<D_{B1-B2}/fw<0.1$ wherein $f_1$ designates the focal length of said negative first lens group;

$f_{1B-2}$ designates the focal length of said rearmost lens element of said negative first lens group;

fw designates the focal length of the entire the zoom lens system at the short focal length extremity;

$D_{1B-2}$ designates the thickness of said rearmost lens element of said negative first lens group; and $D_{B1-B2}$ designates the distance between said positive lens element and said rearmost lens element in said positive sub-lens group.

2. The zoom lens system according to claim 1, wherein said aspherical surface of said rearmost lens element is provided on the object-side surface thereof, and said aspherical surface is formed so that the positive power becomes stronger, compared with a paraxial spherical surface, in a direction away from the optical axis.

3. The zoom lens system according to claim 1, wherein said aspherical surface of said rearmost lens element is provided on the image-side surface thereof, and said aspherical surface is formed so that the positive power becomes stronger, compared with a paraxial spherical surface, in a direction away from the optical axis.

4. The zoom lens system according to claim 1, wherein said aspherical surface of said rearmost lens element of said negative first lens group satisfies the following condition:

$$-1 < \Delta V < -0.1$$

wherein $\Delta V$ designates the amount of change of the distortion coefficient due to said aspherical surface of said rearmost lens element of said negative first lens group under the condition that the focal length at the short focal length extremity is converted to 1.0.

5. The zoom lens system according to claim 1, wherein a refractive index $N_{1A}$ of a glass material of at least one negative lens element of said negative object-side sub-lens group in said negative first lens group satisfies the following condition:

$$N_{1A} < 1.66.$$

* * * * *